(12) United States Patent
Pabalate et al.

(10) Patent No.: US 7,971,181 B2
(45) Date of Patent: Jun. 28, 2011

(54) ENHANCED STATISTICAL MEASUREMENT ANALYSIS AND REPORTING

(75) Inventors: Steven E. Pabalate, Raleigh, NC (US); Jeffrey R. Amspaugh, Great Falls, VA (US); Christine M. Rebok, Ashburn, VA (US); Brian S. Birtell, Falls Church, VA (US); Robert P. Sarlo, Fairfax, VA (US)

(73) Assignee: Accenture Global Services Limited, Dublin (IE)

( * ) Notice: Subject to any disclaimer, the term of this patent is extended or adjusted under 35 U.S.C. 154(b) by 1490 days.

(21) Appl. No.: 11/457,653

(22) Filed: Jul. 14, 2006

(65) Prior Publication Data

US 2008/0016490 A1 Jan. 17, 2008

(51) Int. Cl.
*G06F 9/44* (2006.01)
(52) U.S. Cl. ........................................ 717/104; 717/106
(58) Field of Classification Search ........................ None
See application file for complete search history.

(56) References Cited

U.S. PATENT DOCUMENTS

| | | | |
|---|---|---|---|
| 6,154,766 A | 11/2000 | Yost et al. | |
| 7,019,753 B2 * | 3/2006 | Rappaport et al. | 345/582 |
| 7,058,704 B1 | 6/2006 | Mangipudi et al. | |

OTHER PUBLICATIONS

Extended European Search Report for Application No. 06787354.7—1238/2041681 dated Jul. 21, 2010, 8 pages.
Notification of Transmittal of the International Search Report and the Written Opinion of the International Searching Authority, or the Declaration; International Application No. PCT/US06/27434, dated Nov. 27, 2006 (6 pages).

* cited by examiner

*Primary Examiner* — Chuck O Kendall
(74) *Attorney, Agent, or Firm* — Fish & Richardson P.C.

(57) ABSTRACT

Project information relating to a project is received, the project information identifying a project type, an authorized write entity, and an authorized approval entity, and a valid metric is selected based at least on the project type, the valid metric measuring an aspect of performance of the project. Base measures corresponding to the valid metric are received from the authorized write entity, the base measures further including periodic base measures corresponding to at least one metric period, and aperiodic base measures corresponding to an aperiodic incident, and the valid metric is calculated based on the base measures. The base measures are sorted into excluded base measures and non-excluded base measures, organizational baseline data is imported, and an organizational indicator is calculated based on the non-excluded base measures and the organizational baseline data.

20 Claims, 33 Drawing Sheets

Metrics Output
600

Required
- SIR Turnaround Time
- Peer Review Problem Detection
- Percent SIRs Reopened
- Average Risk Exposure
- Contractual Deliverable Timeliness
- Contractual Deliverable Acceptance

602

Performance Management
At least 1 Performance Management metric must be selected
- Percent SLAs Met ☑
- Average Age of Active CRs ☑
- Average Time to Assign CRs ☐
- Backlog Processing Efficiency - SIRs ☐
- Backlog Processing Efficiency - CRs ☐
- Severity 1 SIR Resolution Percentage ☐
- Average Age of Active SIRs ☐
- Average Time to Assign SIRs ☐
- Support Request Resolution Percentage ☑

604

Cost & Schedule
At least 1 Cost & Schedule metric must be selected
- Cost Performance Index ☐
- Schedule Performance Index ☐
- Percent Budget Remaining ☐
- Average Effort Hours per CR ☑
- Average Effort Hours per SIR ☐

605

601

Additional
Select additional metrics that pertain to the project as needed
- Requirements Volatility ☑
- Change Request Impact ☐
- Peer Review Efficiency ☑
- Percent of Test Scripts Passed ☐
- Severity 1 SIR Percentage ☑
- Milestone Timeliness ☐

606

[Submit] [Cancel] Back to Contract Information

| Deliverable Name | Due Date | Submission Date | Acceptance Date | Client First Response | Current Status | Team Name | Comment | Client First Response Date | Delete | Modify |
|---|---|---|---|---|---|---|---|---|---|---|
| 1 SMART 2.0 RTM | 4/12/2006 | 4/12/2006 | 4/14/2006 | Conditionally Accepted | Fully Accepted | P&T | | | Delete | Edit |
| 2 SMART 2.0 Designs | 4/28/2006 | 5/1/2006 | 5/4/2006 | Conditionally Accepted | Fully Accepted | P&T | | | Delete | Edit |
| 3 SMART 2.0 Source Code | 6/2/2006 | 6/2/2006 | 6/2/2006 | Conditionally Accepted | Fully Accepted | P&T | | | Delete | Edit |

Add New Deliverable

Save  Cancel

Related Metrics: Contractual Deliverable Management Analysis.   * denotes required fields

FIGURE 11

Cost and Schedule Supplemental

| Month | TCPI | Cost Variance (CV) | Schedule Variance (SV) | Project Estimate To Complete (ETC) | Project Estimate At Completion (EAC) | Project Variance At Completion (VAC) | Statistical Estimate To Complete (ETC) | Statistical Estimate At Completion (EAC) | Statistical Variance At Completion (VAC) |
|---|---|---|---|---|---|---|---|---|---|
| 10/2005 | 1.88 | -5,000 | -2,000 | 2,500 | 22,500 | 155 | 10,208 | 30,208 | -7,552 |
| 9/2005 | 1.13 | -1,090 | -2,521 | 3,209 | 17,702 | 4,954 | 10,005.5 | 24,496.5 | -1,842.5 |
| 8/2005 | 1.06 | -838 | -4,053 | 6,357 | 17,962 | 4,594 | 12,814.33 | 24,419.33 | -1,763.33 |
| 7/2005 | 1.02 | -298 | -3,385 | 6,391 | 15,792 | 4,595 | 11,657.53 | 21,058.53 | -667.53 |
| 6/2005 | 1.04 | -502 | -3,551 | 8,511 | 16,802 | 3,589 | 13,414.2 | 21,705.2 | -1,314.2 |
| 5/2005 | 1.02 | -324 | -1,584 | 11,322 | 16,370 | 4,031 | 17,417.85 | 21,965.85 | -1,554.85 |

1802    1801

Related Metrics: CPI, SPI, EVP Model.

| Metric | Definition |
|---|---|
| TCPI | To Complete Performance Index(TCPI) determines how cost efficient, more or less hours expended, the team will need to going forward in order to finish the project on budget. TCPI = ((BCAC-BCWP)/(BCAC-ACWP)) |
| CV | Cost Variance (CV) measures the difference between the budjeted effort and the actual effort. CV shows whether a project is on, how much over, or how much under budget. CV is determined only for task/milestones that have been completed |
| SV | Schedule Variance (SV) determines whether the project is on, ahead, or behind schedule by calculating whether the team has earned (BCWP) more or less value than scheduled (BCWS) by a given period. Formula: SV = BCWP - BCWS |
| P-ETC | The Project Estimate to Complete (Project ETC) is the project team's estimate to complete tasks that have not been completed - it is a subjective measure determined by the opinions of the project team members. |
| P-EAC | The Project Eastimate At Completion (Project EAC) is the actual cost of work completed plus the Project ETC. Project EAC = ACWP + Project ETC |
| P-VAC | Project Variance at completion(P-VAC) is the difference between the budgeted cost at completion (BCAC) and Project Estimate at Completion. Project VAC = BCAC - Project EAC |
| S-ETC | The Statistical Estimate to Completion(S-ETC) is the forecasted effort to complete tasks based on budgeted remaining work divided by cumulative CPI. Formula: Statistical ETC = (BCAC-BCWP)/CPI |
| S-EAC | The Statistical Estimate at Completion (S-EAC) forecasts the total effort, from start to finish, to complete a task and deliver the project based on actual performance to date rather than project team estimates. S-EAC is calculated using Statisitical ETC to determine the number of hours to be used based on current process capability plus the Actual Cost of Work Performed (ACWP). Statistical EAC = ACWP + Statistical ETC |
| S-VAC | The Statistical Variance at Completion is the difference between the planned budget at completion minus the Statistical EAC. Statistical VAC = BCAC - Statistical EAC |

ENHANCED STATISTICAL MEASUREMENT ANALYSIS AND REPORTING

TECHNICAL FIELD

The present disclosure generally relates to project management, and one particular implementation relates to the analysis and reporting of periodic and aperiodic project base measure data.

BACKGROUND

Project management typically involves the application of knowledge, skills, tools and techniques to a broad range of activities in order to meet the requirements of a particular task. For instance, project management knowledge and practices are often described in terms of their component processes, where satisfaction of project goals is ensured by tracking component processes through project completion. In this regard, during performance of the project, project managers often monitor project 'metrics' to gauge the progress towards task completion and completion quality, where each metric represents systems of parameters which provide a quantitative or qualitative assessment of a measured process.

The problems associated with conventional project management systems are myriad. For example, since the metrics which are most useful for a particular project are often unique or non-standard, project analysis resources must be heavily customized, increasing expense and further delaying the progress of the underlying project. Additionally, since metrics provide an interpretation the underlying project raw data, the value of the metric may be compromised if the project data is aberrant or incorrect.

In this regard, it is desirable to provide for enhanced statistical measurement analysis and reporting tools which overcome the deficiencies associated with the prior art. In particular, it is desirable to provide for a standardized analysis tool which offers access to a wide variety of metrics without requiring customized software development, and which may negate the effect of aberrant project data.

SUMMARY

According to one general implementation, project information relating to a project is received, the project information identifying a project type, an authorized write entity, and an authorized approval entity, and a valid metric is selected based at least on the project type, the valid metric measuring an aspect of performance of the project. Base measures corresponding to the valid metric are received from the authorized write entity, the base measures further including periodic base measures corresponding to at least one metric period, and aperiodic base measures corresponding to an aperiodic incident, and the valid metric is calculated based on the base measures. The base measures are sorted into excluded base measures and non-excluded base measures, an organizational baseline is imported, and an organizational indicator is calculated based on the non-excluded base measures and the organizational baseline. The valid metric and at least a portion of the base measures are approved via the authorized approval entity, thereby generating an approved metric and approved base measures, respectively, and the valid metric or the approved metric, and the organizational indicator are output.

Additional implementations may include one or more of the following features. For example, the outputting of the valid metric and the organizational indicator may occur in real-time to receiving the base measures. The metric period may be a day, a week, a month, three months, or a year. The periodic base measures may be a budgeted cost at completion ("BCAC"), a budgeted cost of work performed ("BCWP"), a budgeted cost of work scheduled ("BCWS"), an actual cost of work performed ("ACWP"), a number of approved change requests, a number of requirements, a sum of impact of change requests, a total risk exposure, a number of active risks, a number of clients facing active risks, a number of realized risks, or a number of clients facing realized risks. The aperiodic base measures may be a number of passed scripts, a number of scripts tested, a number of system investigation requests ("SIRs") found, a number of conditions tested, a deliverable type, deliverable acceptance data, a deliverable client first response, a deliverable current status, a deliverable team name, deliverable comments, a milestone name, a scheduled milestone completion data, an actual milestone completion data, a milestone team name, peer review planned data, test pass planned data, actual test passes conducted data, errors found, or removed data. The aperiodic incident may be a system test, a peer review, or a deliverable status.

Additionally, approving the base measures may further include comparing the base measures to the organizational baseline, receiving a corrective action from the authorized write entity, based upon comparing the base measures to the organization baseline, and accepting an approval indicia from the authorized approval entity after a corrective action is received. Selecting the valid metric may also be based upon a user preference. Outputting the valid metric or the approved metric, and the organizational indicator may further include generating a report including the valid metric or the approved metric, and the organizational indicator, and/or displaying a representation of the valid metric or the approved metric, and the organizational indicator, such that the representation may display the valid metric or the approved metric, and the organizational indicator over a plurality of metric periods. The excluded base measures may represent special cause variation data, where the non-excluded base measures represent common cause variation data. The base measures may be cost and schedule base measures, performance management base measures, scope management base measures, milestone management base measures, contract management base measures, quality management base measures, or deliverable base measures.

Moreover, a model may be generated based upon the approved base measures, a modeling algorithm, and internal model parameters, and the model may be output. The internal model parameters may be adjusted based upon user preferences or the periodic base measures. Receiving aperiodic base measures may further including downloading at least one pre-formatted peer review feedback form. The model may be a problem injection and removal ("PIRM") model, a request turnaround prediction ("RTP") model, or an earned value prediction ("EVP") model. The project information may further include contract data, liaison data, or metric period data.

According to another general implementation, a computer program product, tangibly stored on a computer-readable medium, includes instructions to be performed by a computer, the instructions operable to cause the computer to receive project information relating to a project, the project information identifying a project type, an authorized write entity, and an authorized approval entity and select a valid metric based at least on the project type, the valid metric measuring an aspect of performance of the project. The instructions are also operable to receive base measures corresponding to the valid metric from the authorized write entity, the base measures further including periodic base measures corresponding to at least one metric period, and aperiodic base measures corresponding to an aperiodic incident, and calculate the valid metric based on the base measures. The instructions are further operable to sort the base measures into excluded base measures and non-excluded base measures, import an organizational baseline, and calculate an organizational indicator based on the non-excluded base measures and the organizational baseline. Moreover, the instructions are operable to approve the valid metric and at least a portion of the base measures via the authorized approval entity, thereby generating an approved metric and approved base measures, respectively, and output the valid metric or the approved metric, and the organizational indicator.

According to another general implementation, a system includes an input unit, a processor unit, and an output unit. The input unit is configured to receive project information relating to a project, the project information identifying a project type, an authorized write entity, and an authorized approval entity, receive base measures corresponding to a valid metric from the authorized write entity, the base measures further including periodic base measures corresponding to at least one metric period, and aperiodic base measures corresponding to an aperiodic incident, import an organizational baseline, and approve the valid metric and at least a portion of the base measures via the authorized approval entity, thereby generating an approved metric and approved base measures, respectively. The processor unit is configured to select the valid metric based at least on the project type, the valid metric measuring an aspect of performance of the project, calculate the valid metric based on the base measures, sort the base measures into excluded base measures and non-excluded base measures, and calculate an organizational indicator based on the non-excluded base measures and the organizational baseline. The output unit is configure to output the valid metric or the approved metric, and the organizational indicator.

To its advantage, the present disclosure provides for statistical measurement analysis and reporting in which projects, such as projects participating in the U.S. Government Operating Unit ("GOU") & ACCENTURE®'s National Security Services ("ANSS") Quality and Process Improvement ("QPI") Programs, have an interactive web-based application for the reporting and analysis of project measurement data (or 'base measures'). In particular, contract information may be recorded, measurement base measure data for periodic metrics, test results, deliverables, milestones, service level agreements, and models may entered, and peer reviews may be downloaded. Furthermore, measurement and analysis charts, graphs, and tables may be viewed with corrective actions and operating unit and project limits displayed, metric data output may be analyzed, project control limits may be set, and corrective actions may be entered. Moreover, metrics reports may be created based upon user selections, and data entered.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Referring now to the drawings, in which like reference numbers represent corresponding parts throughout:

FIG. 6 depicts an example user interface for displaying a valid metric;

FIG. 7 depicts an example user interface for receiving base measures for a valid metric from an authorized write entity;

FIG. 9 depicts an example user interface for receiving base measures associated with aperiodic test results from an authorized write entity;

FIG. 10 depicts an example user interface for receiving base measures associated with deliverables from an authorized write entity;

FIG. 11 depicts an example user interface for receiving base measures associated with milestones from an authorized write entity;

FIG. 18 depicts an example user interface for displaying 'Cost & Schedule' Supplemental metrics;

FIG. 33 depicts an example user interface for sorting base measures into excluded base measures and non-excluded base measures.

DETAILED DESCRIPTION

Figure 1:
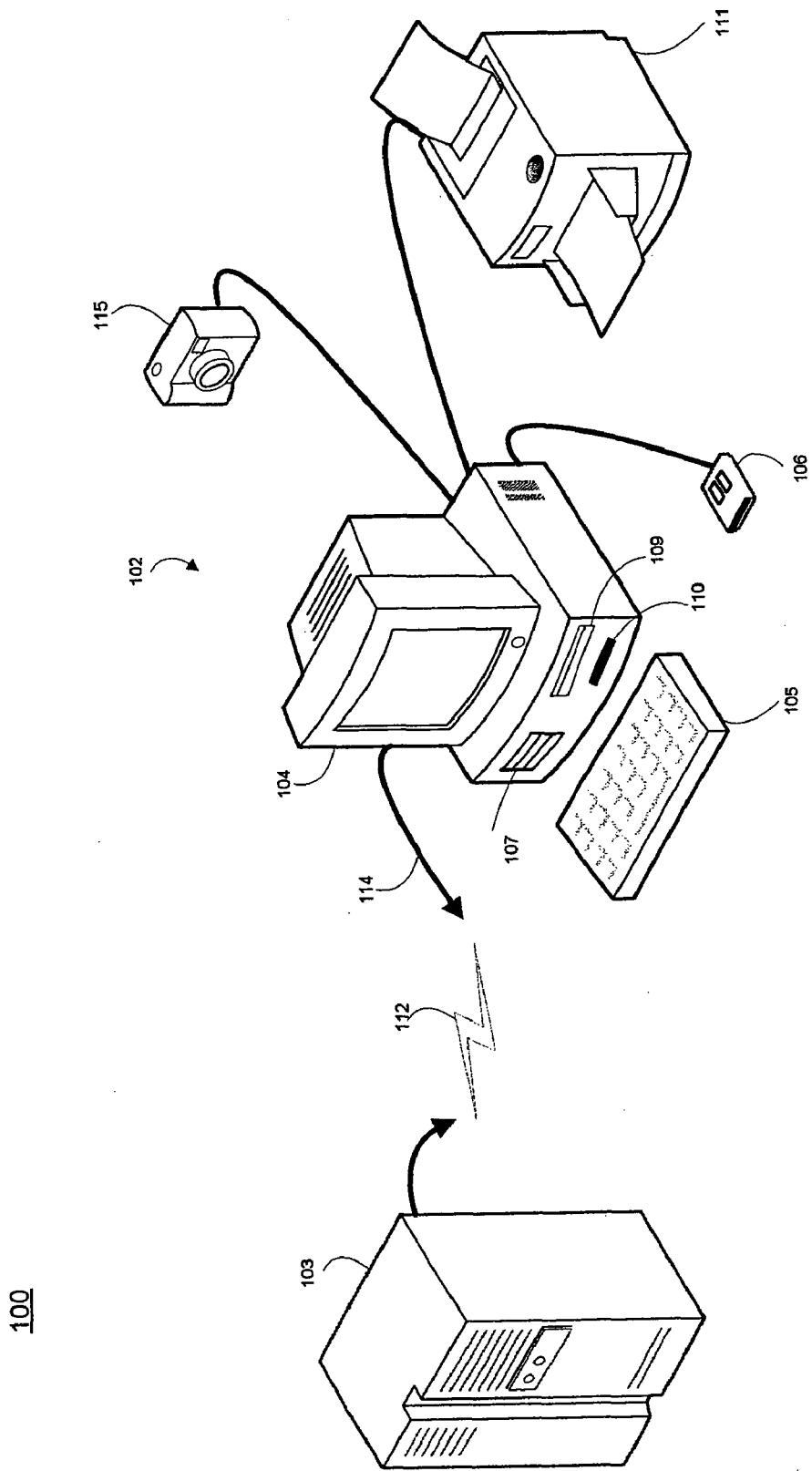
FIG. 1 depicts the exterior appearance of an example system, including a portable storage device coupled to a computer.

FIG. 1 depicts the exterior appearance of an example system 100, where a computer 102 is connected to a data server 103. As shown in FIG. 1, the hardware environment of the computer 102 includes a display monitor 104 for displaying text and images to a user, a keyboard 105 for entering text data and user commands into the computer 102, a mouse 106 for pointing, selecting and manipulating objects displayed on a display monitor 104, a fixed disk drive 107, a removable disk drive 109, a tape drive 110, a hardcopy output device 111, a computer network 112, a computer network connection 114, and a digital input device 115.

The display monitor 104 displays the graphics, images, and text that comprise the user interface for the software applications used by the system 100, as well as the operating system programs necessary to operate the computer 102. A user uses the keyboard 105 to enter commands and data to operate and control the computer operating system programs as well as the application programs. The user uses the mouse 106 to select and manipulate graphics and text objects displayed on the display monitor 104 as part of the interaction with and control of the computer 102 and applications running on the computer 102. The mouse 106 is any type of pointing device, and may be a joystick, a trackball, a touch-pad, or other pointing device. Furthermore, the digital input device 115 allows the computer 102 to capture digital images, and may be a scanner, a digital camera, a digital video camera, or other digital input device. Software used to provide enhanced statistical measurement analysis and reporting is stored locally on computer readable memory media, such as the fixed disk drive 107

In a further implementation, the fixed disk drive 107 itself may include a number of physical drive units, such as a redundant array of independent disks ("RAID"), or may be a disk drive farm or a disk array that is physically located in a separate computing unit. Such computer readable memory media allow the computer 102 to access computer-executable process steps, application programs and the like, stored on removable and non-removable memory media.

The network connection 114 may be a modem connection, a local-area network ("LAN") connection including the Ethernet, or a broadband wide-area network ("WAN") connection such as a digital subscriber line ("DSL"), cable high-speed internet connection, dial-up connection, T-1 line, T-3 line, fiber optic connection, or satellite connection. The network 112 may be a LAN network, a corporate or government WAN network, the Internet, or other network. The computer 102 is directly or indirectly coupled to the data server 103 via network connection, so as to effectuate unidirectional or bidirectional transmission of data between the computer 102 and data server 103. The network connection 114 may be a wired or wireless connector. Example wireless connectors include, for example, an INFRARED DATA ASSOCIATION® ("IrDA®") wireless connector, an optical wireless connector, an INSTITUTE OF ELECTRICAL AND ELECTRONICS ENGINEERS® ("IEEE®") Standard 802.11 wireless connector, a BLUETOOTH® wireless connector, an orthogonal frequency division multiplexing ("OFDM") ultra wide band ("UWB") wireless connector, a time-modulated ultra wide band ("TM-UWB") wireless connector, or other wireless connector. Example wired connectors include, for example, IEEE®-1394 FIREWIRE® connector, USB connector, serial port connector, parallel port connector, or other wired connector.

The removable disk drive 109 is a removable storage device that is used to off-load data from the computer 102 or upload data onto the computer 102. The removable disk drive 109 may be a floppy disk drive, an IOMEGA® ZIP® drive, a compact disk-read only memory ("CD-ROM") drive, a CD-Recordable drive ("CD-R"), a CD-Rewritable drive ("CD-RW"), flash memory, a Universal Serial Bus ("USB") flash drive, thumb drive, pen drive, key drive, or any one of the various recordable or rewritable digital versatile disk ("DVD") drives such as the DVD-Recordable ("DVD-R" or "DVD+R"), DVD-Rewritable ("DVD-RW" or "DVD+RW"), or DVD-RAM. Operating system programs, applications, and various data files, are stored on disks, which are stored on the fixed disk drive 107 or on removable media for the removable disk drive 109.

The tape drive 110 is a tape storage device that is used to off-load data from the computer 102 or to upload data onto the computer 102. The tape drive 110 may be a quarter-inch cartridge ("QIC"), 4 mm digital audio tape ("DAT"), 8 mm digital linear tape ("DLT") drive, or other type of tape.

The hardcopy output device 111 provides an output function for the operating system programs and applications. The hardcopy output device 111 may be a printer or any output device that produces tangible output objects, including textual or image data or graphical representations of textual or image data. While the hardcopy output device 111 is depicted as being directly connected to the computer 102, it need not be. For instance, the hardcopy output device 111 may be connected via a network interface, such as a wired or wireless network.

The data server 103 may or may not be located within the computer 102, although in one implementation the data server 103 exists remotely on a network, and is made of one or more networked data server devices or servers. Applications requesting data stored on the data server 103 will not be able to access the data, or the most updated data, if the computer 102 and the data server 103 are disconnected. The data server 103 executes software which services requests sent by the computer 102, where the data server 103 may include a server farm, a storage farm, or a storage server.

Although the computer 102 is illustrated in FIG. 1 as a desktop PC, in further implementations the computer 102 may be a laptop, a workstation, a midrange computer, a mainframe, an embedded system, telephone, a handheld or tablet computer, a personal digital assistant ("PDA"), or other type of computer.

Although further description of the components which make up the data server 103 is omitted for the sake of brevity, it suffices to say that the hardware environment of the computer or individual networked computers which make up the data server 103 is similar to that of the exemplary hardware environment described herein with regard to the computer 102. In an alternate implementation, the functions of the computer 102 and the data server 103 are combined in a single, combined hardware environment.

Figure 2:
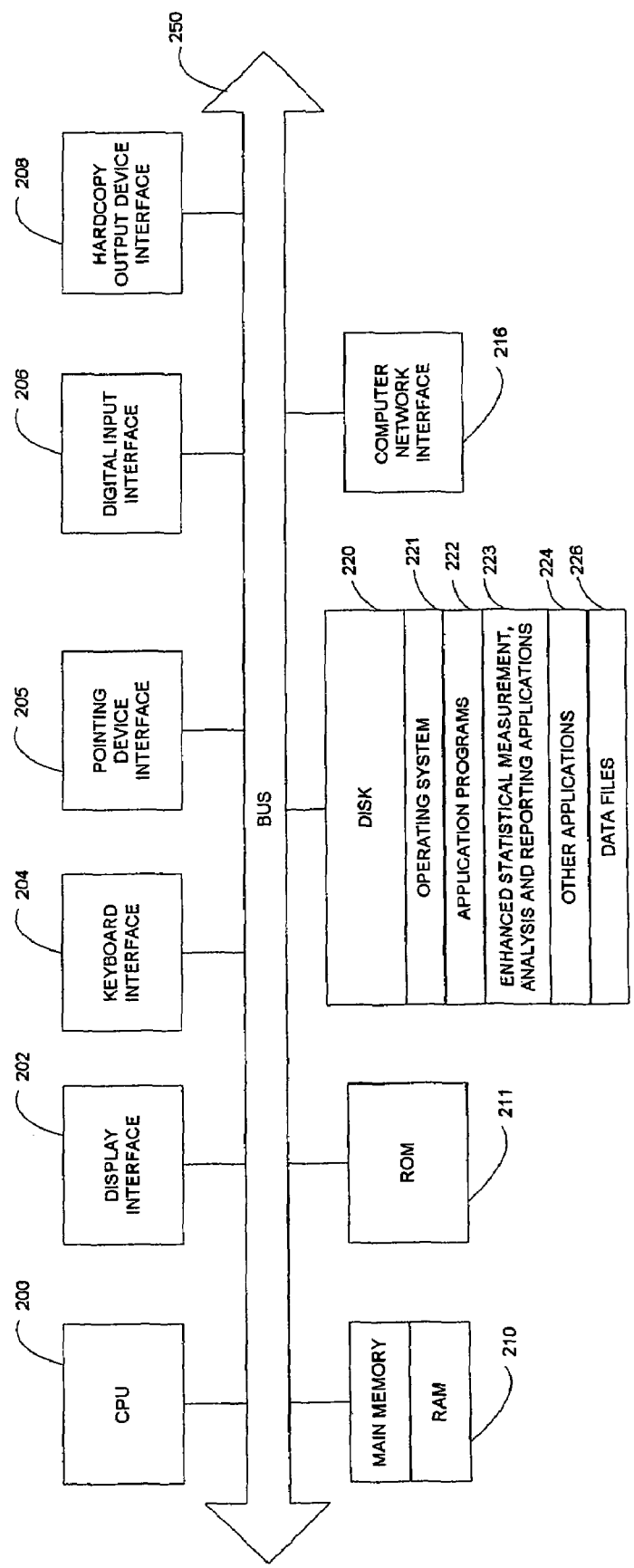
FIG. 2 depicts an example of an internal architecture of the computer of FIG. 1.

FIG. 2 depicts an example of an internal architecture of the computer 102, as implemented in FIG. 1. The computing environment includes a computer central processing unit ("CPU") 200 where the computer instructions that comprise an operating system or an application are processed; a display interface 202 which provides a communication interface and processing functions for rendering graphics, images, and texts on the display monitor 104; a keyboard interface 204 which provides a communication interface to the keyboard 105; a pointing device interface 205 which provides a communication interface to the mouse 106 or an equivalent pointing device; a digital input interface 206 which provides a communication interface to the digital input device 115; a hardcopy output device interface 208 which provides a communication interface to the hardcopy output device 111; a random access memory ("RAM") 210 where computer instructions and data are stored in a volatile memory device for processing by the computer CPU 200; a read-only memory ("ROM") 211 where invariant low-level systems code or data for basic system functions such as basic input and output ("I/O"), startup, or reception of keystrokes from the keyboard 105 are stored in a non-volatile memory device; and optionally a storage 220 or other suitable type of memory (e.g. such as random-access memory ("RAM"), read-only memory ("ROM"), programmable read-only memory ("PROM"), erasable programmable read-only memory ("EPROM"), electrically erasable programmable read-only memory ("EEPROM"), magnetic disks, optical disks, floppy disks, hard disks, removable cartridges, flash drives), where the files that comprise an operating system 221, application programs 222 (including enhanced statistical measurement analysis and reporting application 223, and other applications 224 as necessary) and data files 226 are stored; a computer network interface 216 which provides a communication interface to the computer network 112 over the computer network connection 114. The constituent devices and the computer CPU 200 communicate with each other over the computer bus 250.

The RAM 210 interfaces with the computer bus 250 so as to provide quick RAM storage to the computer CPU 200 during the execution of software programs such as the operating system application programs, and device drivers. More specifically, the computer CPU 200 loads computer-executable process steps from the fixed disk drive 107 or other memory media into a field of the RAM 210 in order to execute software programs. Data is stored in the RAM 210, where the data is accessed by the computer CPU 200 during execution.

Also shown in FIG. 2, the computer 102 stores computer-executable code for a windowing operating system 221, application programs 222 such as word processing, spreadsheet, presentation, gaming, or other applications. Although it is possible to provide enhanced statistical measurement analysis and reporting using the above-described implementation, it is also possible to implement the functions according to the present disclosure as a dynamic link library ("DLL"), or as a plug-in to other application programs such as an Internet web-browser such as the MICROSOFT® Internet Explorer web browser.

The computer CPU 200 is one of a number of high-performance computer processors, including an INTEL® or AMD® processor, a POWERPC® processor, a MIPS® reduced instruction set computer ("RISC") processor, a SPARC® processor, an ACORN® RISC Machine ("ARM®") architecture processor, a HP ALPHASERVER® processor or a proprietary computer processor for a mainframe. In an additional arrangement, the computer CPU 200 is more than one processing unit, including a multiple CPU configuration found in high-performance workstations and servers, or a multiple scalable processing unit found in mainframes.

The operating system 221 may be MICROSOFT® WINDOWS NT®/WINDOWS® 2000/WINDOWS® XP Workstation; WINDOWS NT®/WINDOWS® 2000/WINDOWS® XP Server; a variety of UNIX®-flavored operating systems, including AIX® for IBM® workstations and servers, SUNOS® for SUN® workstations and servers, LINUX® for INTEL® CPU-based workstations and servers, HP UX WORKLOAD MANAGER® for HP® workstations and servers, IRIX® for SGI® workstations and servers, VAX/VMS for Digital Equipment Corporation computers, OPENVMS® for HP ALPHASERVER®-based computers, MAC OS® X for POWERPC® based workstations and servers; SYMBIAN OS®, WINDOWS MOBILE® or WINDOWS CE®, PALM®, NOKIA® OS ("NOS"), OSE®, or EPOC® for mobile devices, or a proprietary operating system for computers or embedded systems. The application development platform or framework for the operating system 221 may be: BINARY RUNTIME ENVIRONMENT FOR WIRELESS® ("BREW®"); Java Platform, Micro Edition ("Java ME") or Java 2 Platform, Micro Edition ("J2ME®"); PYTHON™, FLASH LITE®, or MICROSOFT® .NET Compact.

While FIGS. 1 and 2 illustrate one possible implementation of a computing system that executes program code, or program or process steps, configured to effectuate enhanced statistical measurement analysis and reporting, other types of computers may also be used as well.

Figure 3:
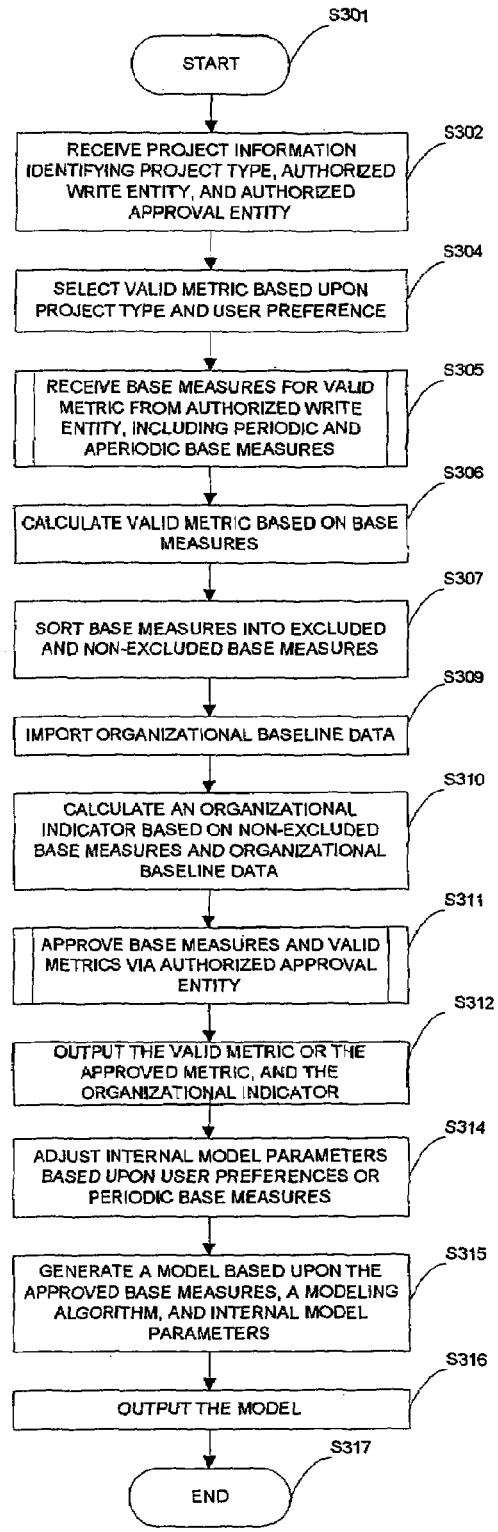
FIG. 3 is a flow chart illustrating a computer-implemented technique in accordance with one general implementation.

FIG. 3 is a flowchart illustrating computer-implemented method 300 in accordance with one general implementation. Briefly, project information relating to a project is received, the project information identifying a project type, an authorized write entity, and an authorized approval entity, and a valid metric is selected based at least on the project type, the valid metric measuring an aspect of performance of the project. Base measures corresponding to the valid metric are received from the authorized write entity, the base measures further including periodic base measures corresponding to at least one metric period, and aperiodic base measures corresponding to an aperiodic incident, and the valid metric is calculated based on the base measures. The base measures are sorted into excluded base measures and non-excluded base measures, an organizational baseline is imported, and an organizational indicator is calculated based on the non-excluded base measures and the organizational baseline. The valid metric and at least a portion of the base measures are approved via the authorized approval entity, thereby generating an approved metric and approved base measures, respectively, and the valid metric or the approved metric, and the organizational indicator are output.

In more detail, when method 300 begins (step S301), 'project information' relating to a project is received, the project information identifying a project type, an authorized write entity, and an authorized approval entity (step S302). The project information may further include contract data, liaison data, or metric period data. A 'project' is a temporary endeavor undertaken to create a unique product or service, where 'temporary' means that the project has a definite beginning date and a definite end date. Most project teams are created for the purpose of performing or creating a piece of work or service, where project teams are often disbanded upon project completion.

It is possible that several projects might fall underneath an umbrella, higher-level 'program,' and that several contracts might fall underneath an umbrella, higher level project. A 'program' refers to a group of projects managed in a coordinated way, to obtain benefits ordinarily not available from managing the projects individually. A 'contract' is defined as a mutually binding agreement that obligates the seller to provide a specified product or service, and obligates the buyer to pay for the product or service. Moreover, an 'entity' is defined as an individual or group of individuals, an organization, a computer, and/or other separate and discrete units which are capable of providing, transmitting, analyzing, or otherwise communicating project information, base measures, metric data, and/or model data. For instance, although base measures are described herein as being entered manually by a user, base measures may also be entered by a computer, such as via a wired or wireless network connection, with or without human intervention. By 'valid,' it is intended that premises for which the 'valid' metric may logically or mathematically derived be deemed to exist, determined by the basis of the validation. For example, if a particular base measures are not deemed to exist for a particular project type, metrics which would be calculated using those particular base measures would be deemed 'invalid' metrics, and would therefore not be selected. On the other hand, metrics which could be calculated using base measures which would be deemed to exist for a particular project type, would be deemed 'valid' metrics, and would perhaps therefore be selected.

Figure 4:
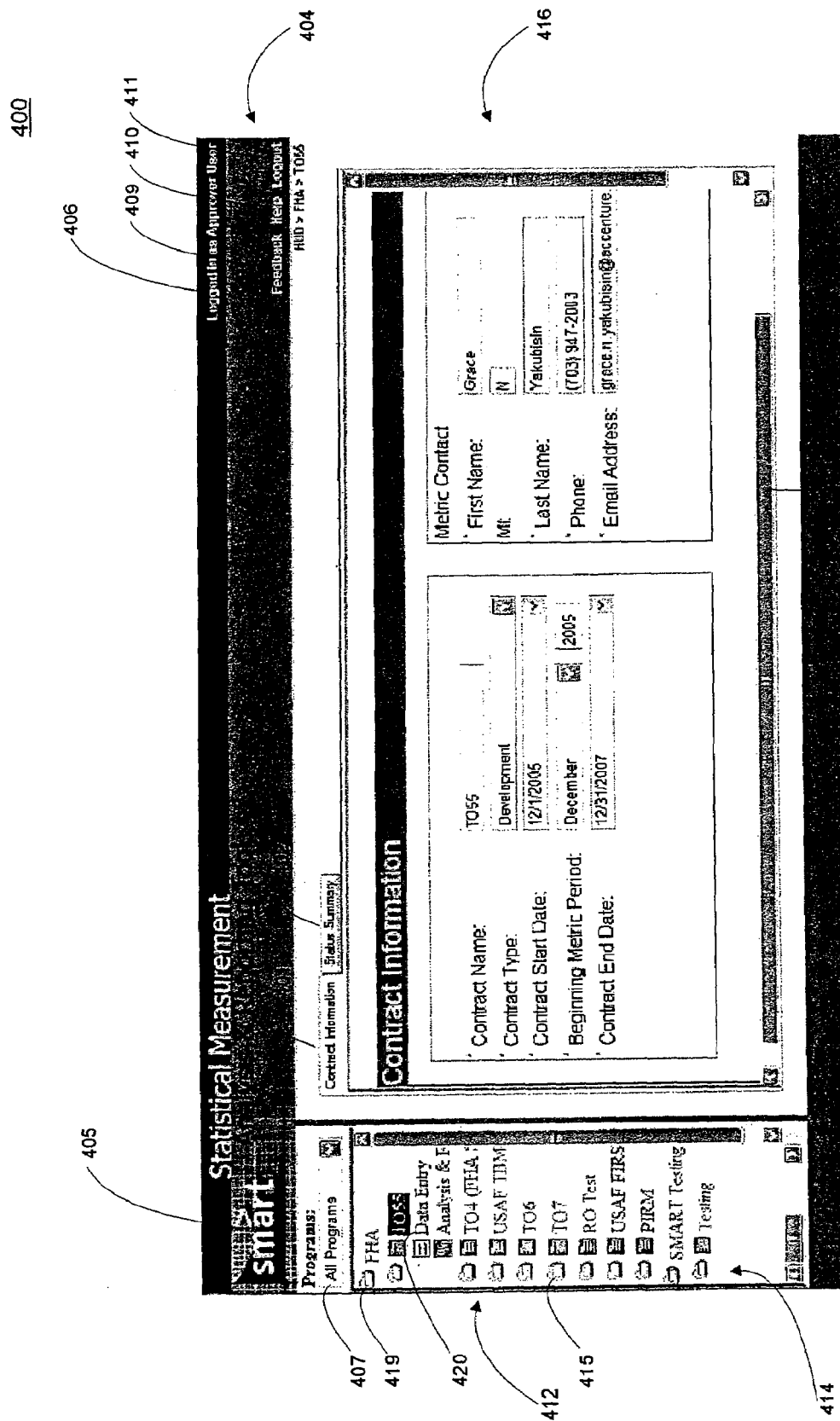
FIG. 4 depicts an example user interface for receiving project information relating to a project.

Referring ahead briefly, FIG. 4 depicts an example user interface 400 used by a computer executing the enhanced statistical measurement analysis and reporting application, for receiving project information relating to a project. By selecting a Contract Information tab 401, information about the contract and metric point-of-contact information is entered. Comments, such as comments made by a process improvement ("PI") liaison or an authorized review entity may also be received and displayed using a status summary tab 402. User interface 400 includes a header section 404 which displays logo information 405, user login information 406, a program drop-down 407, a feedback link 409, a help link 410, and/or a logout link 411. By default, the program drop-down 407 may display the "All Programs" selection. A breadcrumb trail may also show the path that a user has taken to arrive at a current page.

The navigation pane 412 displays a tree-view control 414 of all projects to which a user is authorized to access. The tree-view control 414 includes a nested series of nodes which are selected to display information on a project, associated contracts, data entry, analysis and reporting, in a main content pane. A 'node' is a level of information within the navigation pane 412 that, when selected, changes the information viewed in the content pane 416. Nodes may be nested within other nodes.

By default, all projects for all programs may be included in the tree-view control 414, so that users are enabled to make a specific selection from the program drop-down list if needed, limiting the projects displayed to those belonging to a selected program. Within the navigation pane 412, each contract node, such as "TO7" contract node 415, may be expanded as well, to support data entry, analysis and reporting. The navigation pane 412 may be hidden to maximize viewing of other panes on a browser, using a 'hide' or 'show' control.

The content pane 416 dynamically displays information for a user-selected node within the navigation pane 412, where each pane displays tabbed sections which allow a user to navigate through sections related to the selected node. A project information page 417 is displayed in the content pane 416 when a project node, such as 'FHA' project node 419, is selected from the navigation pane 412. The project information page 417 includes general information about the selected project, and may be displayed in a read-only mode.

The Contract Information tab 401 is displayed in the content pane 416 when a contract node, such as the contract node 415, is selected from the navigation pane 412. The Contract Information tab 401 or another tab may be a default tab. In the Contract Information tab 401, project information about a selected contract belonging to a project is entered and displayed. An authorized write entity enters project information in the displayed data input fields, and then selects a 'save' control. After a new contract has been created, the navigation pane 412 will refresh and display the newly-created contract name instead of a 'new contract' label. The status summary tab 402, which is the other tab displayed in the content pane 416 when a contract node is selected from the navigation pane, displays PI Liaison or authorized review entity comments. By default, the status summary tab 402 may be hidden behind the Contract Information tab 401, such that users would have to select the status summary tab 402 to access it.

Figure 5:
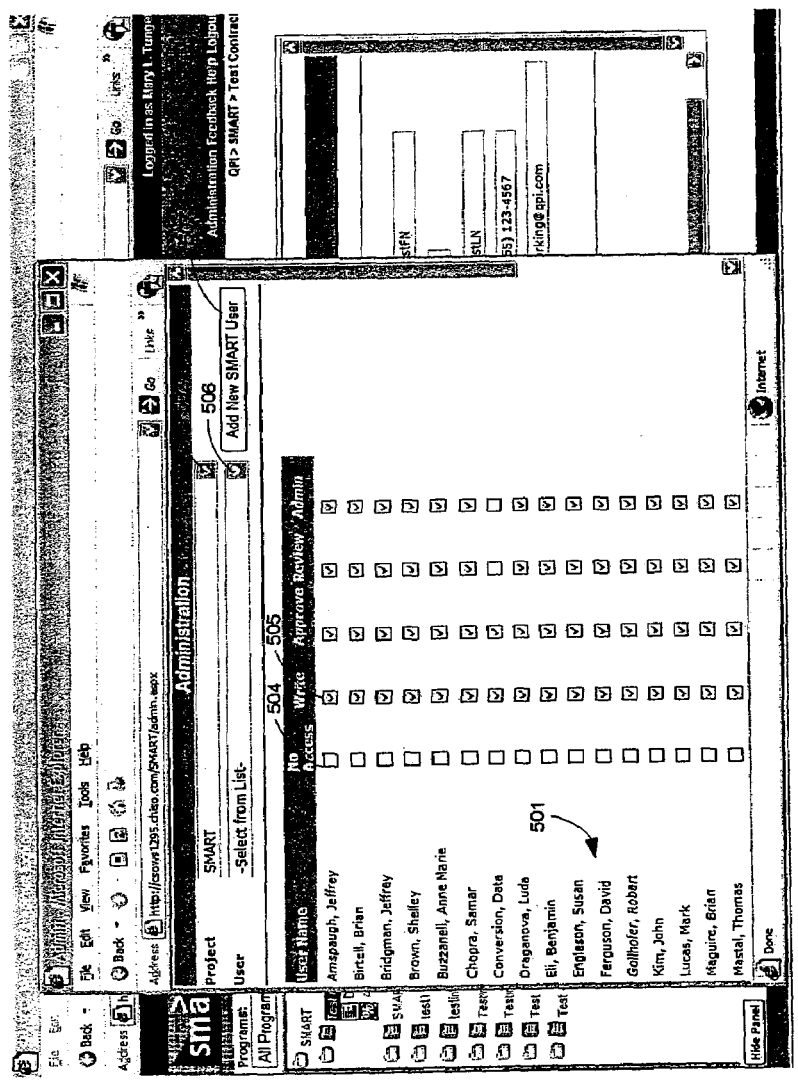
FIG. 5 depicts an example user interface for designating authorized write and approval entities.

FIG. 5 depicts an example user interface 500 used by a computer executing the enhanced measurement analysis and reporting application, for designating authorized write and approval entities. By using permission types, an authorized administrator entity may add new entities or users, and select or change permission types for existing entities or users. By assigning a user the 'administrator' user permission, the user may select permission types for other individuals or entities associated with the project who may have access to the enhanced statistical management and analysis reporting application and corresponding data.

Figure 32:
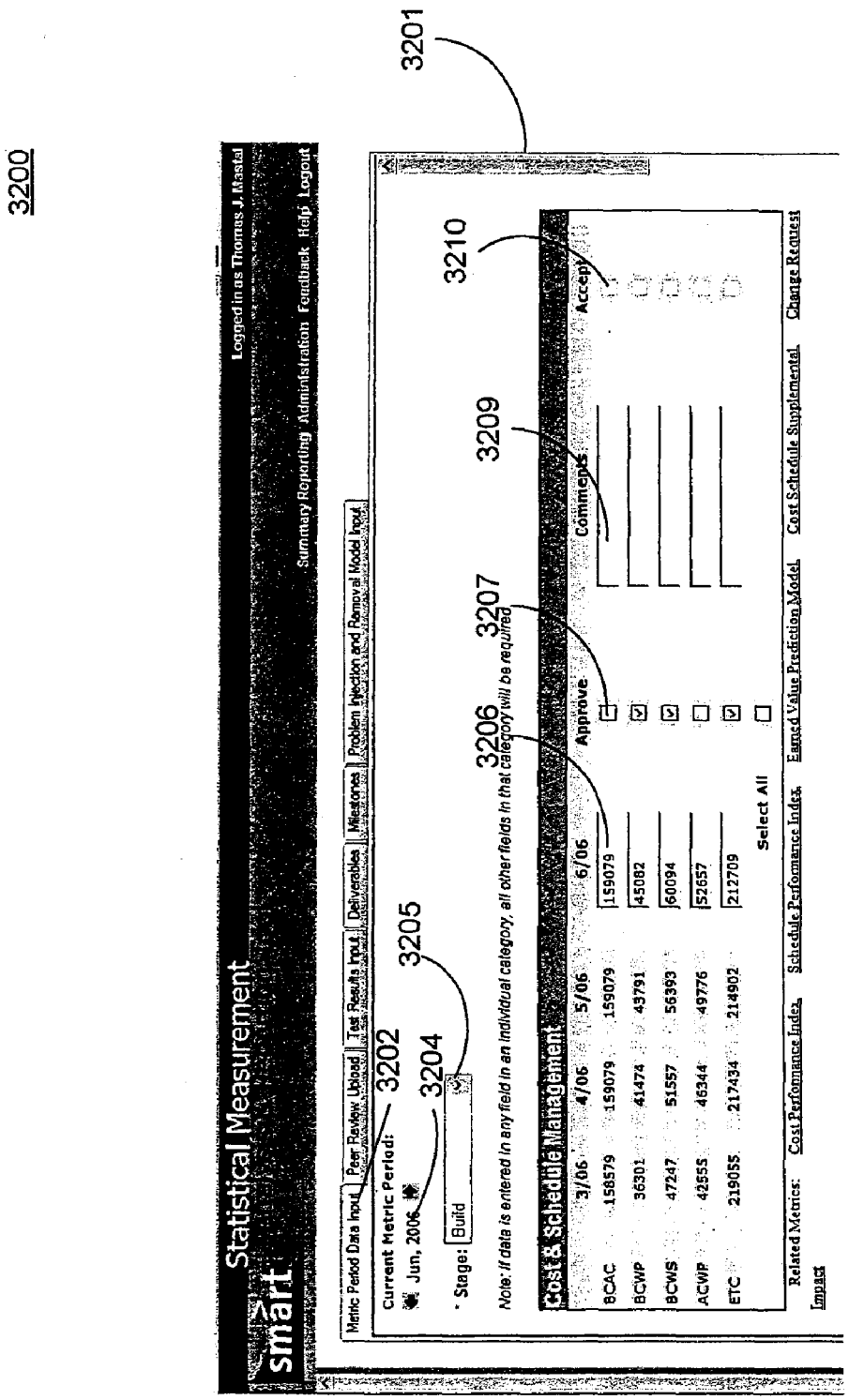
FIG. 32 depicts an example user interface for approving base measures and valid metrics, thereby generating approved metrics and approved base measures.

User interface 500 may be accessed using an 'administration' link in header section 404, which is visible if the user is an authorized administrator entity, or has administrator privileges (such as in FIG. 32). A user list 501 associated with a project is viewed by selecting a project name from project drop-down list 502. User permissions are set or modified using checkboxes, such as checkboxes 504 and 505 listed under the permission types. By selecting a name from a user drop-down list 506, the authorized administrator entity may assign project permissions to a selected user. If a user is not displayed in the user drop-down list 506, an authorized administrator entity may add new users to a project with an 'add new user' control 507. According to one example implementation, to create a new user, a valid enterprise identification number is added into a text box, the appropriate permission checkbox is indicated, and the new user is saved.

'Writer' permission indicates that the user is an authorized write entity, allowing the user to perform functions associated with entering project data and base measures and viewing comments entered by an authorized review entity, and metric approval statuses. In one aspect, the user listed as 'metric contact' on the Contract Information tab 401 is an allowed write entity. The 'writer' user permission type allows the user to perform functions associated with entering data into the enhanced measurement analysis and reporting application, provides access to authorized review entity comments and indicia of whether metrics have been reviewed, accepted and/or approved.

'Approver' permission indicates that the user is an authorized approval entity, allowing the user to perform all of the functions associated with an approved write entity, as well as the function of creating new contracts and approving base measures. In one aspect, a user listed as a project manager is an authorized approval entity.

'Reviewer' permission indicates that the user is an authorized review entity, allowing the user to perform all of the functions of an authorized approval entity, with the exception of approving metrics. In one aspect, a user listed as a PI liaison is an authorized review entity. In addition to the above-described functions, an authorized review entity has the ability to review base measures, enter or modify comments, accept data entry fields, exclude base measures, and provide comments associated with a base measure exclusion. In summary, the 'reviewer' user permission type provides a user with the ability to review, accept and/or exclude metric period data inputs, and provide related comments.

Users with authorized approval entity permission or authorized review entity permission may create a new project, and enter project information such as contract name, contract type, contract start date, beginning metric period, and contract end date. A metric point-of-contact may also be supplied, by providing a name, phone number, e-mail address, and/or other contact information.

Returning to FIG. 3, a valid metric is selected based at least on the project type, the valid metric measuring an aspect of performance of the project (step S304). According to one implementation, high-level questions are asked of a user, where a 'yes' answer to the high-level question expands a section to offer a set of more-detailed questions. These questions assist the user to select metrics which are appropriate to a specific project. If a user has already selected metrics, current metric selections may be viewed, or selections of metrics may be changed. In an additional implementation, selecting the valid metric may also be based upon a user preference, such as where valid metrics are predetermined by a user prior to project information being entered.

FIG. 6 depicts an example user interface 600 used by a computer executing the enhanced measurement analysis and reporting application, for selecting a valid metric. After a user has answered certain questions, and/or based upon the project information, a metrics output page 601 displays a valid list of metrics. 'Required' metrics 602, as the name implies, are required for all similar projects and cannot be changed. 'Performance Management' metrics 604 and 'Cost & Schedule' metrics 605 may be changed or altered. 'Additional' metrics 606 may be added by the user.

Once the user selects the desired metrics, a validation occurs to verify that the user has selected a valid combination of metrics, outputting at least one valid metric. After the valid metrics have been generated, a 'review/edit metrics' link may be added to the Contract Information tab 401. This link provides access to a metric selector page so the user may view or modify selected metrics. Changes to the metrics may be made even after the contract has submitted base measures for one or more metric periods. If a metric is deleted after metric period data is reported, the user will not see that particular metric or any base measures associated with that metric, although the base measures may remain in a database.

Base measures corresponding to the valid metric are received from the authorized write entity, the base measures further including periodic base measures corresponding to at least one metric period, and aperiodic base measures corresponding to an aperiodic incident (step S305). Receiving aperiodic base measures may further including downloading at least one pre-formatted peer review feedback form. One example process for receiving base measures is described, infra, with regard to FIG. 30.

Although the metric period is often described and exemplified herein as being a month, in actuality the metric period could be a millisecond, a second, a minute, an hour, a day, a week, three months, a year, a decade, a hundred years, a millennium, or any other conceivable time frame. If the metric period is a month, it is displayed in a month/year (mm/yy) format. The base measures may be categorized as 'Cost & Schedule' measures, 'Performance Management' base measures, 'Scope Management' base measures, Milestone Management' base measures, 'Contract Management' base measures, 'Quality Management' base measures, Deliverable base measures, or any other category of statistical measurement data.

The periodic base measures may be a BCAC, a BCWP, a BCWS, an ACWP, a number of approved CRs, a number of requirements, a sum of impact of CRs, a total risk exposure, a number of active risks, a number of clients facing active risks, a number of realized risks, or a number of clients facing realized risks. The aperiodic base measures may be a number of passed scripts, a number of scripts tested, a number of SIRs found (where a SIR is a report describing a software problem that has been discovered, either by testing or review), a number of conditions tested, a deliverable type, deliverable acceptance data, a deliverable client first response, a deliverable current status, a deliverable team name, deliverable comments, a milestone name, a scheduled milestone completion data, an actual milestone completion data, a milestone team name, peer review planned data, test pass planned data, actual test passes conducted data, errors found, or removed data. The aperiodic incident may be a system test, a peer review, or a deliverable status.

Figure 7:
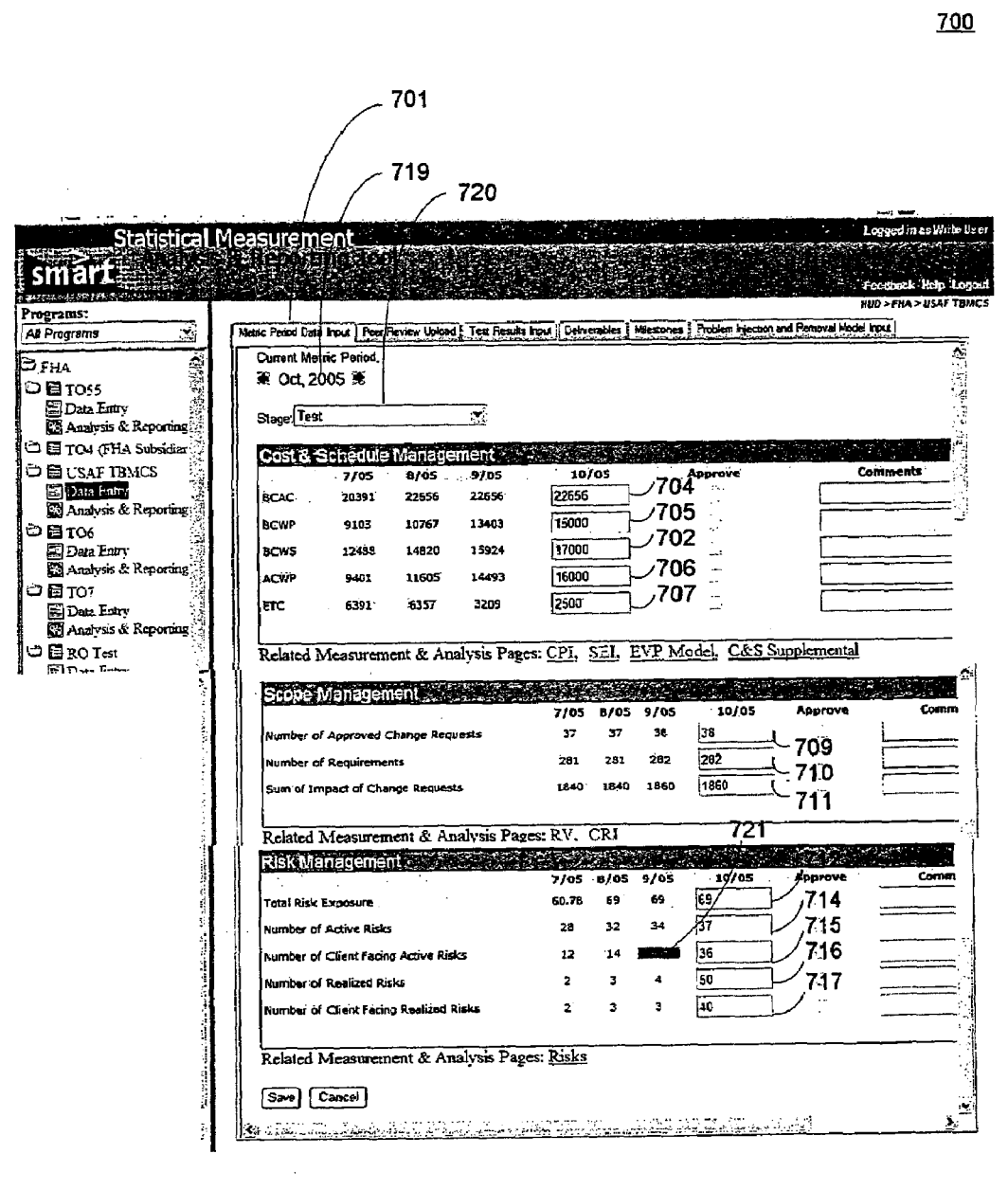

By selecting a data entry node, such as 'Data Entry' node 420 of FIG. 4, an authorized write entity may effectuate the entry of base measures. FIG. 7 depicts an example user interface 700, which is used by a computer executing the enhanced measurement analysis and reporting application, for receiving base measures for a valid metric from an authorized write entity. In particular, the user interface 700 includes Metric Period Data Input tab 701, into which base measures may be entered in a 'Cost & Schedule' Management category, a Scope Management category, a Risk Management category, a Change Request ("CR") Management category, an SIR Management category, a Support Request Management category, or any other categories.

A data input field, such as BCWS field 702, receives entry of base measures from an authorized write entity. Base measures are reviewed and approved each metric period, although entry, review and/or approval may occur more or less frequently. An authorized approval entity approves the entry of base measures, and an authorized review entity may accept base measures and enter comments detailing reasons for the exclusion of base measures when the base measures are not accepted.

The Metric Period Data Input tab 701 includes multiple data input fields, such as a BCAC field 704, a BCWP field 705, the BCWS field 702, an ACWP field 706, an 'estimated time to complete' ("ETC") field 707, a 'number of approved CRs' field 709, a 'number of requirements' field 710, a 'sum of impact of CRs' field 711, a 'total risk exposure' field 712, a 'number of active risks' field 714, a 'number of client facing active risks' field 715, a 'number of realized risks' field 716, a 'number of client facing realized risks' field 717, and/or other data input fields. By selecting the current month (or other metric period) on the current metric period control 719 and using a stage selector drop-down list 720, base measures are entered into the appropriate fields. Data entry fields which are highlighted, such as data entry field 721, indicate that the base measures displayed therein have not been approved by an authorized approval entity.

Figure 8:
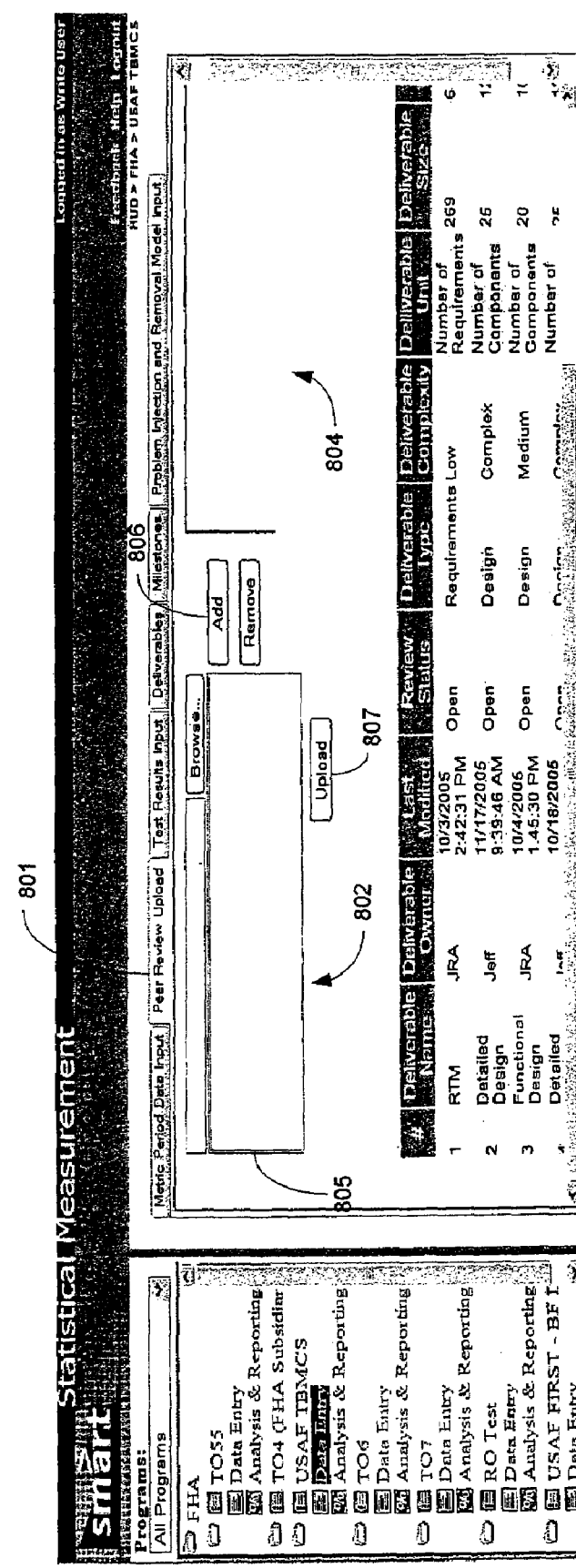
FIG. 8 depicts an example user interface for automatically receiving base measures for a valid metric associated with peer reviews, from an authorized write entity.

FIG. 8 depicts an example user interface 800, which is used by a computer executing the enhanced measurement analysis and reporting application, for automatically receiving base measures for a valid metric associated with peer reviews, from an authorized write entity. By selecting Peer Review Upload tab 801 on user interface 800 when a data entry node is selected from the tree-view control, base measures from existing peer review files may be automatically downloaded from an authorized write entity. Base measures obtained via Peer Review Upload tab 801 may be used to compute metrics such as the Peer Review Problem Detection metric or the Peer Review Efficiency metric.

The peer review files may be downloaded using a browse function in a single-selection upload tool 802 or using drag-and-drop functionality on a multiple file upload applet 804. The Peer Review Upload tab 801 is a page where data from an existing peer review file or files may be uploaded to the enhanced measurement analysis and reporting application. By 'download' it is meant that a file is copied from one computer to another, such as a computer operated by the authorized write entity to the computer executing the statistical measurement analysis and reporting application. In this example, the computer operated by the authorized write entity uploads the file, while the computer executing the statistical measurement analysis and reporting application downloads the file.

A single-selection upload tool 802 allows for the selection of single files from various locations on a host computer using a windowing operating system browse functionality. Each file may be incrementally added to upload list 805 using an 'add' control 806. Once all files have been selected, the user may click on an 'upload' control 807 to initiate downloading of the peer review files from the authorized write entity into the enhanced measurement analysis and reporting application. In order to download multiple files from the user into the enhanced measurement analysis and reporting application, an authorized write entity may execute an applet which allows for files or folders to be dragged directly to a region 804 associated with the multiple file upload applet, where region 804 may display an image, such as a file folder, to make the uploading of multiple files more intuitive to a user. Limits may be set by an authorized administrator entity to limit the size and number of files downloaded. Although the process of receiving files from a remotely-located authorized write entity to the statistical measurement analysis and reporting application has been referred to herein as 'downloading,' from the perspective of the remotely-located authorized write entity, the transaction may also be labeled an 'uploading' operation. For this reason, control 807, which is selected by the remotely-located authorized write entity, is labeled 'upload,' and not 'download,' although the labeling of such a control may be modified to reflect the perspective of the operator.

Figure 9:
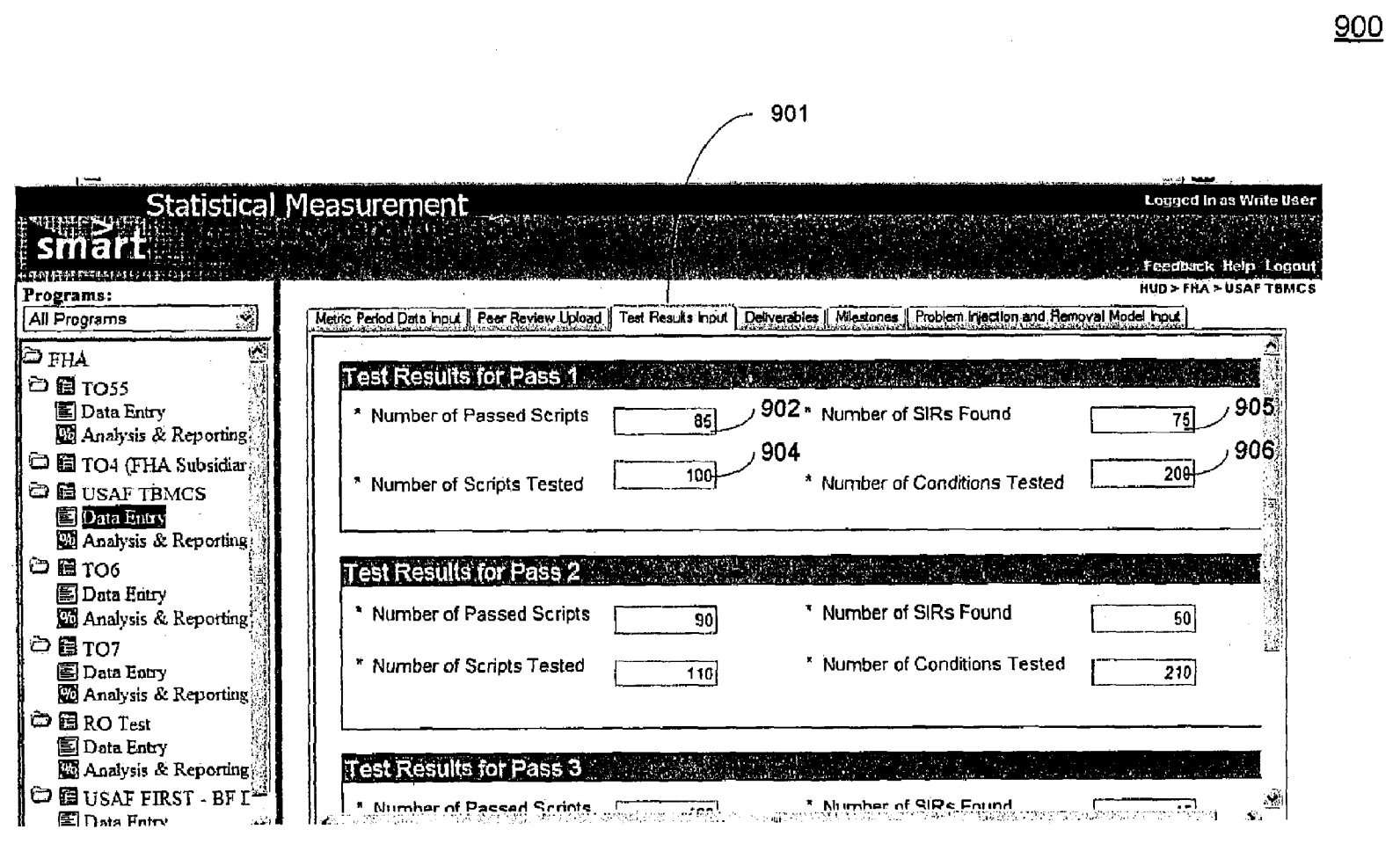

FIG. 9 depicts an example user interface 900, which is used by a computer executing the enhanced measurement analysis and reporting application, for receiving base measures associated with aperiodic test results from an authorized write entity. In more detail, the user interface 900 includes a 'test results' input tab 901, which allows for the entry of base measures into data input fields, such as a 'number of passed scripts' field 902, a 'number of scripts tested' field 904, a 'number of SIRs found' field 904, a 'number of conditions tested' field 906, and/or other data input fields.

FIG. 10 depicts an example user interface 1000, which is used by a computer executing the enhanced measurement analysis and reporting application, for receiving base measures associated with deliverables from an authorized write entity. In more detail, the user interface 1000 includes a Deliverables tab 1001, which displays an 'add new deliverable' control 1002. A 'deliverable' is any tangible outcome that is produced by the project. By selecting the 'add new deliverable' control 1002, an authorized write entity is allowed to enter aperiodic base measures into data input fields associated with a deliverable, such as a 'deliverable name' field 1004, a 'due date' field 1005, a 'submission date' field 1006, an 'acceptance date' field 1007, a 'client first response' field 1009, a 'current status' field 1010, a 'team name' field 1010, a 'comment' field 1012, a 'client first response date' field 1014 field, and/or other fields. By selecting a 'delete' control 1015 or an 'edit' control 1016, the base measures associated with a particular deliverable may be deleted or modified, respectively.

The 'client first response' field 1009 is a data entry field pertaining to the client's first response to a deliverable which has been submitted to the client for review. Entry options for the client first response field 1009 include 'Data Missing,' 'Not Submitted,' 'Pending,' 'Conditionally Accepted,' 'Fully Accepted,' 'Rejected,' 'No Response,' 'Not submitted' or other options. 'Not submitted,' the default value, indicates that a deliverable has not yet been submitted to the client. 'Pending' indicates that the client has acknowledged submission of the deliverable, but is still reviewing and has not yet accepted. 'Conditionally accepted' indicates that the client has indicated that the deliverable will be accepted when minor revisions are completed. 'Fully accepted' indicates that the client has signed off on the deliverable, with no more revisions required. 'Rejected' indicates that the client has returned the deliverable with major revisions required. 'No response' indicates that there is no client acknowledgement of the submission of the deliverable.

Figure 11:
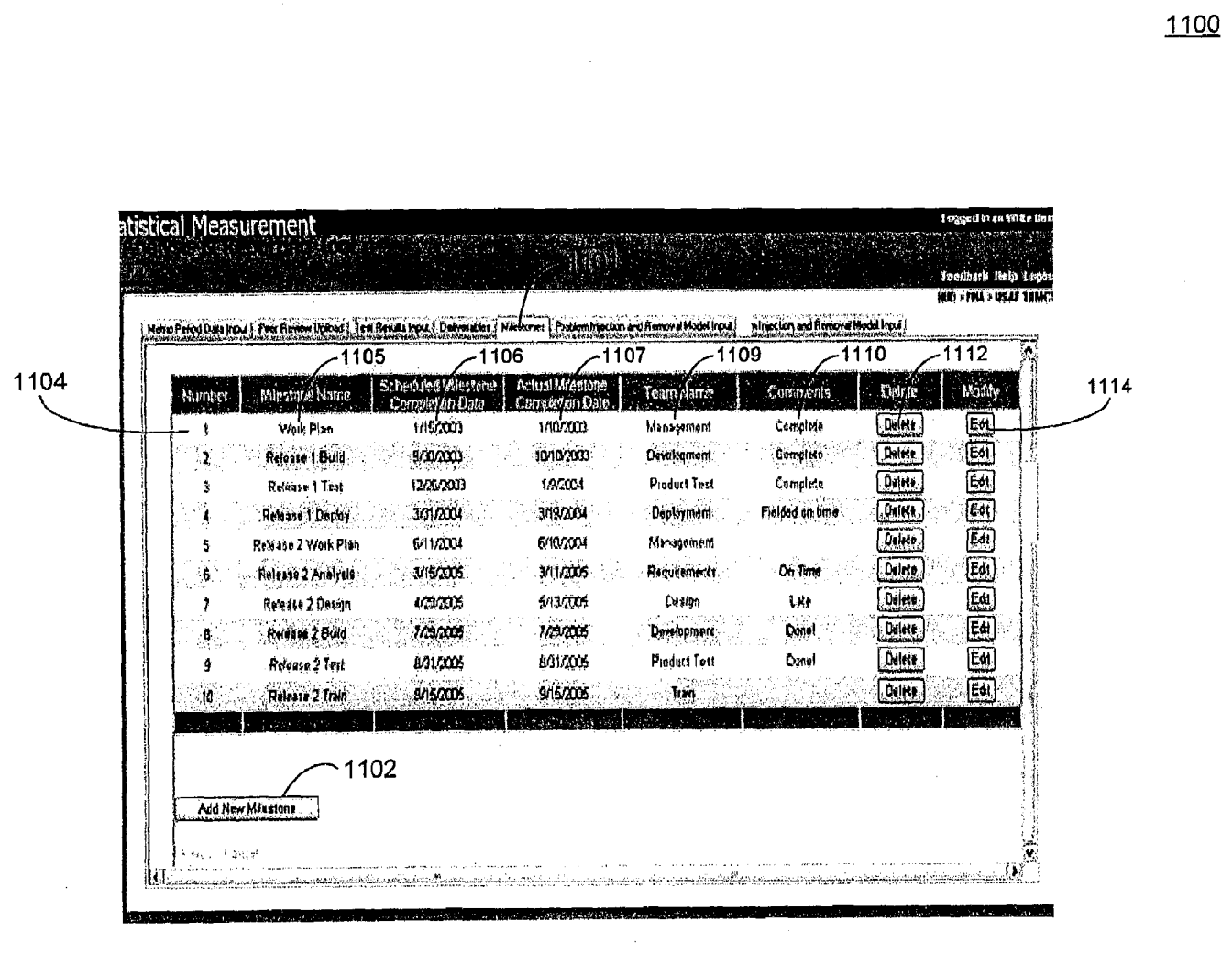

FIG. 11 depicts an example user interface 1100, which is used by a computer executing the enhanced measurement analysis and reporting application, for receiving base measures associated with milestones from an authorized write entity. Within the framework of project management, a 'milestone' is a terminal element that marks the completion of a work package or phase, typically marked by a high level event such as a completion, endorsement or signing of a deliverable, document, or a high level review meeting. Typically, a milestone is associated with some sort of decision that outlines the future of a project.

In more detail, user interface 1100 includes Milestones tab 1101, which allows for the entry and tracking of information relating to milestones, such as actual or expected milestone dates. In particular, by selecting the 'add new milestone' control 1102, an authorized write entity is allowed to enter aperiodic base measures into data input fields associated with a milestone, such as a 'milestone number' field 1104, a 'milestone name' field 1105, a 'scheduled milestone completion date' field 1106, an 'actual milestone completion date' field 1107, a 'team name' field 1109, a 'comment field' 1110, and/or other fields. By selecting a 'delete' control 1112 or an 'edit' control 1014, the base measures associated with a particular milestone may be deleted or modified, respectively.

Figure 12:
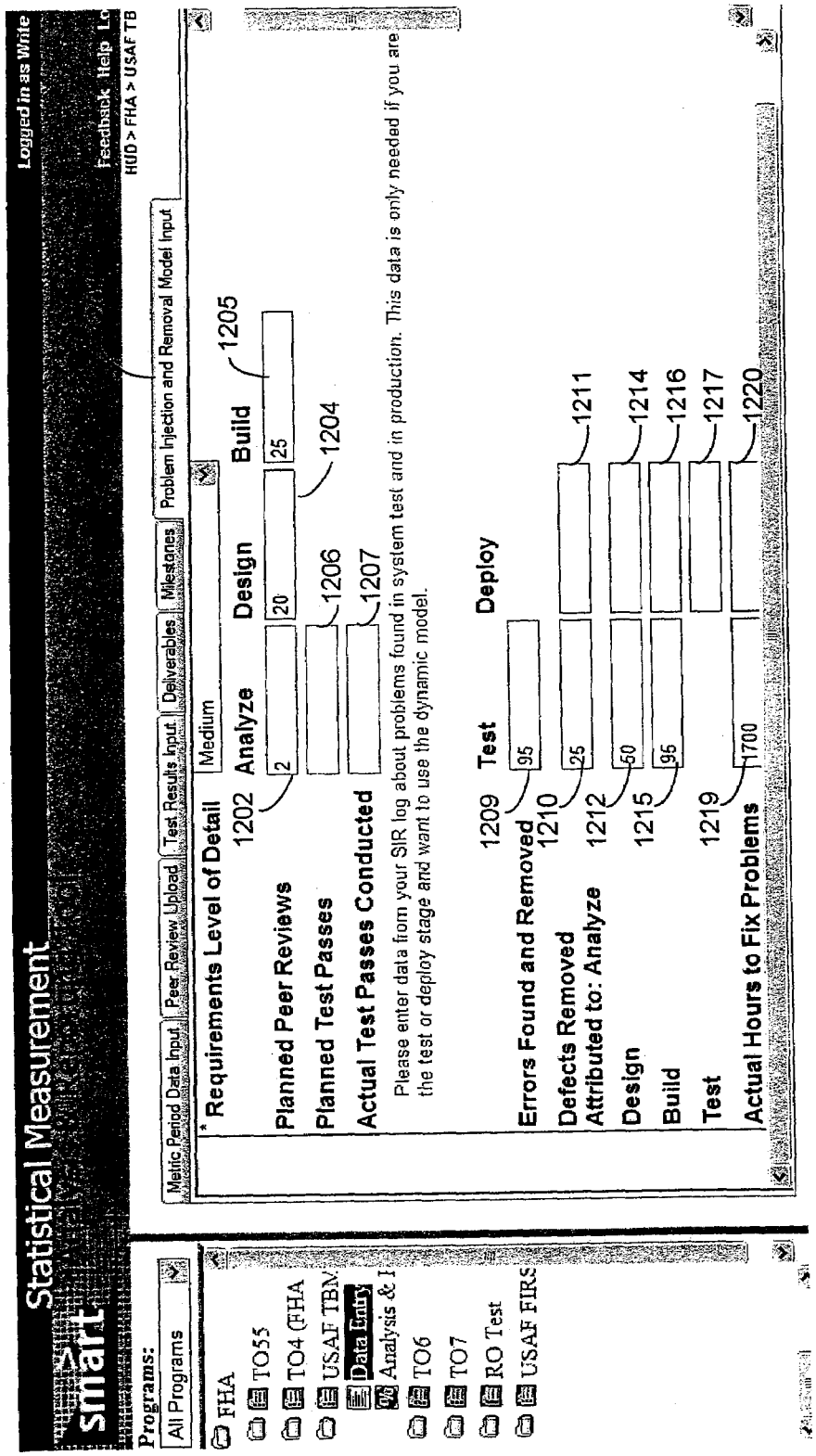
FIG. 12 depicts an example user interface for receiving base measures associated with a PIRM from an authorized write entity.

FIG. 12 depicts an example user interface 1200, which is used by a computer executing the enhanced measurement analysis and reporting application, for receiving base measures associated with a PIRM from an authorized write entity. The PIRM predicts the number of problems in each stage of the development lifecycle, broken out by number of errors, number of defects from each prior stage, and number of faults and latent faults. The PIRM includes a static model and a dynamic model. The static model uses industry data to predict the number of problems that would be expected to be found in removed, where the dynamic model uses historical project base measures, such as the number of errors and defects found in each stage, in modeling. Each model may be displayed in a grid format as well as in a bar graph and/or a line or scatter plot graph.

In more detail, user interface 1200 includes 'Problem Injection and Removal Model Input' tab 1201, which allows for the entry of information in a variety of data input fields, such a 'planned peer review analyze' field 1202, a 'planned peer review design' field 1204, a 'planned peer review build' field 1205, a 'planned test passes' field 1206, an 'actual test passes conducted' field 1207, an 'errors found and removed' field 1209, a 'defects removed attributed to: analyze test' field 1210, a 'defects removed attributed to: analyze deploy' field 1211, a 'design test' field 1212, a 'design deploy' field 1214, a 'build test' field 1215, a 'build deploy' field 1216, a 'test deploy' field 1217, an 'actual hours to fix problems test' field 1219, an 'actual hours to fix problems deploy' field 1220, and/or other fields. The PIRM may also pull data from the Contract Information tab 401, the Metric Period Data Input tab 701, the Peer Review Upload tab 801, or other locations in order to perform calculations. As described below with regard to step S314, other non-depicted data input fields include override effectiveness percentages analyze, design, build, test or deploy fields, where override percentages are entered when a project has sufficient historical data on its ability to find and remove problems.

User interface also includes other tabs, such as a Service Level Agreements ("SLAs") tab, in which several level agreement information is input. A 'service level agreement' is an agreement which outlines the services, and levels of services, to be provided by a supplier to a customer, as well as the measures related to the agreed-upon levels of service. A 'Percent SLAs Met' metric may be calculated based upon the percentage of unique requiring or one-time SLAs that a project has met on a metric-period basis. Other data input fields, such as an 'evaluation date' field or an 'SLA met' field in the SLAs tab are also completed in order to calculate the 'Percent SLAs Met' metric calculation.

Returning to FIG. 3, the valid metric is calculated based on the base measures (step S306). The calculation of metrics is described, infra, with respect to Equations (1) to (36). In Equations (1) to (36), the mathematical operator 'Σ' represents a 'sum of' or 'total of' arithmetic operation. The 'Cost & Schedule' Management metric category, for example, includes metrics such as a CPI metric, a Schedule Performance Interest ("SPI") metric, an EVP metric, 'Cost & Schedule' Supplemental metrics, a Percent Budget Remaining metric, an Average Effort Hours Per CR metric, and an Average Effort Hours per SIR metric.

The CPI metric may be used to determine of a project is on budget, and also to determine if the scope of the project is clearly defined and managed. BCWP is defined as the total budget for tasks that are 100% complete, and is calculated at a cumulative level for the project or release. ACWP is further defined as the amount of effort measured in hours that was actually spent on completing the task for those tasks that are 100% complete. The target for the CPI metric is 1; if the value of the CPI metric is greater than 1 then the project us under budget, and if the value of the CPI metric is less than 1, then the project is using more effort than planned to complete the tasks and is over budget. The formula for calculating the CPI metric is expressed below, in Equation (1):

$$CPI = \frac{BCWP}{ACWP} \quad (1)$$

The SPI metric is used to determine if a project is earning value at the scheduled rate, and to assist managers in estimating if a project will complete on time according to the current trend. The formula for calculating the SPI metric is expressed below, in Equation (2):

$$SPI = \frac{BCWP}{BCWS} \quad (2)$$

BCWS is defined as a total budget for tasks that were scheduled to be completed and is calculated at a cumulative level for the project or release. The target for the value of the SPI metric is 1; if the value of the SPI metric is greater than 1, then the project is performing more work than planned, and if the value of the SPI metric is less than 1 the project is performing less work than planned.

The Percent Budget Remaining metric identifies a budget remaining based on the actual work performed to date. The formula for calculating the Percent Budget Remaining metric is expressed below, in Equation (3):

$$\text{Percent Budget Remaining} = \frac{BCAC - \text{Actual Cost to Date}}{BCAC} \quad (3)$$

BCAC is defined as the budgeted cost of the work completed to date, and Actual Cost to Date is defined as the amount of effort measured in hours that was actually spent on completing a task to date, including in-progress tasks.

The Average Effort Hours Per CR metric is used to identify the amount of effort spent on CR analysis and implementation in a given metric period. The formula for calculating the Average Effort Hours Per CR metric is expressed below, in Equation (4):

$$\text{Avg. Effort Hours per } CR = \frac{\sum \text{Actual Effort Hours on Resolved } CRs}{\text{Number of Resolved } CRs} \quad (4)$$

The Average Effort Hours per SIR metric allows project managers to monitor the actual amount of hours spent on resolving SIRs in a given month. The formula for calculating the Average Effort Hours per SIR metric is expressed below, in Equation (5):

$$\text{Average Effort Hours per } SIR = \frac{\sum \text{Actual Effort Hours on Resolved } SIRs}{\text{Number of Resolved } SIRs} \quad (5)$$

The Scope Management metric category includes metrics such as a Requirements Volatility metric, a CR Impact metric, and/or other metrics. The Requirements Volatility metric is used to measure the amount of change to the scope of a project. The formula for calculating the Requirements Volatility metric is expressed below, in Equation (6):

$$\text{Requirements Volatility} = \frac{\text{Approved Change Requests}}{\sum \text{Number of Requirements}} \quad (6)$$

The CR Impact metric measures the impact of changes in a project's scope relative to the size of the project. The formula for calculating the CR Impact metric is expressed below, in Equation (7):

$$CR\ Impact = \frac{\sum Impact\ (in\ Hours)\ of\ CRs}{BCAC} \quad (7)$$

The Cost Variance ("CV") metric measures the difference between the budgeted effort and the actual effort, such that a user may determine whether a project is on, over, or under budget. The CV metric is determined for work projects that have already been completed. The formula for calculating the CV metric is expressed below, in Equation (8):

$$CV = BCWP - ACWP \quad (8)$$

The Project Estimate to Complete ("P-ETC") metric is the project team's estimate of the amount of effort remaining to complete its tasks. The P-ETC is a subjective measurement, determined by the opinions of the project team members. The formula for calculating the P-ETC metric is expressed below, in Equation (9):

$$P - ETC = \sum Team\ Member \quad (9)$$
Estimates For Time Remaining to Complete Tasks The Project Estimate At Completion ("P-EAC") metric is the project team's estimate of the total effort, from start to finish, which will be required to complete its tasks. The formula for calculating the P-EAC metric is expressed below, in Equation (10):

$$P - EAC = (P - ETC) + \sum Time\ Spent \quad (10)$$

The Project Variance At Completion ("P-VAC") metric measures how far the project team's estimate of the amount of effort to complete the tasks will be over or under budget at completion. The formula for calculating the P-VAC metric is expressed below, in Equation (11):

$$P\text{-}VAC = BCAC - (P\text{-}EAC) \quad (11)$$

The Statistical Estimate To Completion ("S-ETC") metric forecasts the amount of effort remaining to complete a task at the current efficiency rate. The S-ETC metric assumes that future performance will be similar to past performance for the same kind of task. The tasks used as the basis may be all completed tasks, or a subset of the most similar ones. The formula for calculating the S-ETC metric is expressed below in Equation (12):

$$S - ETC = \frac{BCAC - BCWP}{CPI} \quad (12)$$

The Statistical Estimate At Completion ("S-EAC") metric forecasts the total efforts, from start to finish, to complete a task and deliver the project based on actual performance to date, rather than project team estimates. The formula for calculating the S-EAC metric is expressed below in Equation (13):

$$S\text{-}EAC = ACWP + (S\text{-}ETC) \quad (13)$$

The Statistical Variance At Completion ("S-VAC") metric indicates whether the forecasted amount of total effort to complete a task is on, over, or under budget. The formula for calculating the S-VAC metric is expressed below in Equation (14):

$$S\text{-}VAC = BCAC - (S\text{-}EAC) \quad (14)$$

The Schedule Variance ("SV") metric indicates whether the project team is on, ahead, or behind schedule by calculating whether a team has earned more or less value than scheduled, for a given metric period. The formula for calculating the SV metric is expressed below in Equation (15):

$$SV = BCWP - BCWS \quad (15)$$

The To Complete Performance Index ("TCPI") metric indicates how efficient the team will need to be in order to finish the project on budget. The TCPI metric may be calculated and reviewed each metric period, at the project level. The formula for calculating the TCPI metric is expressed below in Equation (16):

$$TCPI = \frac{BCAC - BCWP}{BCAC - ACWP} \quad (16)$$

The Risk Management metric category includes metrics such as an Average Risk Exposure metric, and/or other metrics. The 'number of active risks' is a base measure that is displayed as a metric count, and is defined as client-facing (with total) risks. A 'number of realized risks' is also a base measure that is displayed as a metric count, and is defined as client-facing risks that have been realized to date.

The Average Risk Exposure metric is used to determine how risk is being managed by a given project, to determine future risks which exist ahead, and to determine the average level of risk exposure a project has, as an indicator of how the risk mitigation process is being used. The formula for calculating the Average Risk Exposure metric is expressed below, in Equation (17):

$$Average\ Risk\ Exposure = \frac{\sum Risk\ Exposure\ For\ All\ Active\ Risks}{\sum Number\ of\ Active\ Risks} \quad (17)$$

The Quality Management metric category includes metrics such as a Severity 1 SIR Percentage metric, a Percent SIRs Reopened metric, a Passed Scripts Percentage metric, the Peer Review Problem Detection-Requirements, Design, Source Code, Test, Maintenance Request, Plans, Training or Other metrics, or the Peer Review Efficiency-Requirements, Design, Source Code, Test, Maintenance Request, Plans, Training Materials, or Other metrics.

The Percent Of Test Scripts Passed metric is used to determine how many solutions were correct during each pass through a test script. The formula for the Percent Of Test Scripts Passed metric is expressed below, in Equation (18):

$$Percent\ Of\ Test\ Scripts\ Passed = \frac{Number\ Of\ Scripts\ That\ Passed}{\sum Number\ of\ Scripts} \times 100 \quad (18)$$

A Peer Review Problem Detection metric, corresponding to each deliverable document type, is used to determine the quality of deliverables being reviewed. The size of the deliverable correlates with the unit of the deliverable reviewed. Each project selects one unit measure per deliverable document type, such as the case where a unit corresponds to a number of modules for a source code deliverable type. The formula for the Peer Review Problem Detection metric is expressed below, in Equation (19):

$$\text{Peer Review Problem Detection} = \frac{\sum \text{Number of Problems}}{\text{Deliverable Size}} \quad (19)$$

A Peer Review Efficiency metric, also known as a Peer Review Effectiveness Ratio ("PRER") measures how many problems are uncovered per time unit, such as an hour, spent on peer review activities. In one implementation, the Peer Review Efficiency is calculated for each of 'Requirements,' 'Design,' 'Source Code,' 'Test,' 'Maintenance Request,' 'Plans,' 'Training Materials,' and 'Other' deliverable document types. The formula for the Peer Review Efficiency metric is expressed below, in Equation (20):

$$\text{Peer Review Efficiency} = \frac{\sum \text{Number of Problems}}{\text{Preparation Time} + \text{Review Time}} \quad (20)$$

The Percent SIRs Reopened metric measures a project's ability to effectively close SIRs and avoid the reopening of SIRs once fixed code has been sent to the system test team. The formula for the Percent SIRs Reopened metric is expressed below, in Equation (21):

$$\text{Percent } SIRS \text{ Reopened} = \frac{\sum \text{Number of Fixed } SIRs \text{ That Were Reopened}}{\sum \text{Number of Fixed } SIRs} \times 100 \quad (21)$$

The Severity 1 SIR Percentage metric allows users to measure the percentage of SIRs that are determined to be the highest severity, which is an indicator of a project's ability to manage quality and avoid severe defects. The definition of a 'Severity 1 SIR' will vary by project. The formula for the Severity 1 SIR Percentage metric is expressed below, in Equation (22):

$$\text{Severity 1 } SIR \text{ Percentage} = \frac{\text{Number of Severity 1 } SIRs}{\sum \text{Number of } SIRs} \times 100 \quad (22)$$

The Milestone Management metric category includes several metrics, including the Milestone Timeliness metric, the Milestone Average Days Late metric, or other metrics. Using the Milestone Management metric category, users may view Milestone Timeliness and Average Days Late metrics, a Milestone Timeliness graph, GOU limits, contract limits, and corrective actions. One purpose of the Milestone Average Days Late and Milestone Timeliness metrics is to determine how often milestones set forth by a project are being completed on time, or behind schedule. The formulas for calculating the Milestone Timeliness metric and the Milestone Average Days Late metric are expressed below, with respect to Equations (23) and (24), respectively:

$$\text{Milestone Timeliness} = \frac{\text{Number of Milestones Met To Date}}{\text{Number of Milestones Scheduled To Date}} \quad (23)$$

$$\text{Milestone Average Days Late} = \quad (24)$$
$$\frac{\sum \text{Number of Days For Missed Milestones}}{\text{Number of Missed Milestones}}$$

The Contractual Deliverable Management metric category includes several metrics, including the Contractual Deliverable Timeliness metric, the Contractual Deliverable Average Days Late metric, the Contractual Deliverable Acceptance metric, and others. The formulas for calculating the Contractual Deliverable Timeliness metric, and the Contractual Deliverable Average Days Late metric are expressed below, with reference to Equations (25) and (26), respectively:

$$\text{Deliverable Timeliness} = \quad (25)$$
$$\frac{No. \text{ of Contractual Deliverables Met to Date}}{No. \text{ of Contractual Deliverables Scheduled to Date}}$$

$$Dlvrable. \text{ Avg. Days Late} = \quad (26)$$
$$\frac{\sum No. \text{ Days Late for Missing Contractual } Dlvrables.}{\text{Number of Contractual } Dlvrables.}$$

The Performance Management metric category includes several metrics, including the Percent SLAs Met metric, the Average Age of Active CRs metric, the Average Time to Assign CRs metric, the Average Time to Assign SIRs metric, the Backlog Processing Efficiency-CRs metric, the Backlog Processing Efficiency-SIRs metric, the Support Request Resolution Percent metric, the Severity 1 Resolution Percentage metric, the SIR Turnaround Time metric, the Average Age of Active SIRs metric, and/or other metrics.

The Percent SLAs Met metric measures the project's ability to meet service level targets specified in its SLA, which is an indicator of the project's performance. The formula for calculating the Percent SLAs Met metric is expressed below, in Equation (27):

$$\text{Percent } SLAs \text{ Met} = \frac{\sum \text{Number of } SLAs \text{ Met}}{\sum \text{Number of } SLAs} \times 100 \quad (27)$$

In Equation (27), the 'Σ Number of SLAs' refers to the total number of unique engagement-defined SLAs with an evaluation date set to the current metric period. This base measure is not the total number of instances per SLA. The 'Σ Number of SLAs Met' refers to the number of unique engagement-defined SLAs that have the SLA Met field as 'Yes' on the appropriate SLA base measure entry user interface, and an evaluation date field set to the current metric period.

The 'Average Age of Active CRs' metric allows user to measure the time CRs remain active in the system, since the average age of active CRs is an indicator of the project's performance. The formula for calculating the Average Age of Active CRs metric is expressed below, in Equation (28):

$$\text{Average Age of Active } CRs = \frac{\sum \text{Number Days Active for Active } CRs}{\text{Number of Active } CRs} \quad (28)$$

The 'Average Time to Assign CRs' measures the time elapsed between when a new CR is created and when it takes the first step in the CR process, such is when the CR is assigned, rejected or deferred. The formula for calculating the Average Time to Assign CRs metric is expressed below, in Equation (29):

$$\text{Average Time to Assign } CRs = \frac{\sum \text{Days } CRs \text{ Were New}}{\sum \text{Number of } CRs} \quad (29)$$

In Equation (29), the 'Σ Days CRs Were New' is defined as the number of days elapsed between when the CR was created, and when it was assigned an initial status, such as 'Assigned,' 'Rejected' or 'Deferred.' 'Σ Number of CRs' are all CRs in the tracking system.

The Average Time to Assign SIRs metric measures the time elapsed between when a new SIR is created, and when the SIR takes the first step in the SIR process, such as when it is assigned, rejected, or deferred. The formula for calculating the Average Time to Assign SIRs metric is expressed below in Equation (30):

$$\text{Average Time to Assign } SIRs = \frac{\sum \text{Number Days } SIRs \text{ Were New}}{\sum \text{Number of } SIRs} \quad (30)$$

In Equation (30), 'Σ Days SIRs Were New' is defined as the number of days elapsed between when the SIR was created and when it was assigned an initial status, such as 'Assigned,' 'Rejected' or 'Deferred.' 'Σ Number of SIRs' are the total number of all SIRs in the tracking system.

The Backlog Processing Efficiency-CRs metric measures a project's ability to manage the accumulation of CRs, and is similar to the ADMetrics 'Backlog Processing Efficiency' metric. The Backlog Processing Efficiency-CRs metric is defined as the ratio of incoming CRs versus outgoing CRs, where the formula for calculating the Backlog Processing Efficiency-CRs metric is expressed below in Equation (31), where 'Resolved CRs' is defined as CRs that were fixed, tested and resolved.:

$$\text{Backlog Processing Efficiency-} CRs = \frac{\sum \text{Number of } CRs}{\text{Number of Resolved } CRs} \quad (31)$$

The Backlog Processing Efficiency-SIRs measures the project's ability to manage the accumulation of SIRs, and is defined as the ratio of incoming SIRs versus outgoing SIRs. The Backlog Processing Efficiency-SIRs metric also measures the efficiency of the resolution of SIRs, and is calculated and reviewed on a metric period basis. The formula for calculating the Backlog Processing Efficiency metric is expressed below in Equation (32), where 'Resolved SIRs' is defined as those SIRs which were fixed and successfully tested.:

$$\text{Backlog Processing Efficiency-} SIRs = \frac{\sum \text{Number of } SIRs}{\text{Number of Resolved } SIRs} \quad (32)$$

The Support Request Resolution Percentage metric allows user to monitor the percentage of support requests that are resolved within project-defined time targets, which is an indicator of the project's performance. The formula for calculating the Support Request Resolution Percentage metric is expressed below in Equation (33):

$$\text{Support } Rqst. \text{ Resolution \%} = \frac{No. \text{ of Support } Rqsts. \text{ Resolved on Time}}{No. \text{ of Support } Rqsts. \text{ Resolved}} \times 100 \quad (33)$$

The Severity 1 SIR Resolution Percentage allows user to monitor the percentage of Severity 1 SIRs that were resolved within project-specified time targets, which is an indicator of project performance. The formula for calculating the Severity 1 SIR Resolution Percentage metric is expressed below in Equation (34):

$$\text{Severity 1 Resolution \%} = \frac{\text{Number of Severity 1 } SIRs \text{ Closed on Time}}{\text{Number of Severity 1 } SIRs \text{ Closed}} \times 100 \quad (34)$$

The SIR Turnaround Time metric allows users to monitor the turnaround time required to resolve its SIRs, which is an indicator of the project's performance. The formula for calculating the SIR Turnaround Time metric is expressed below in Equation (35):

$$SIR \text{ Turnaround Time} = \frac{\sum \text{Number of Days Resolved } SIRs \text{ were Active}}{\text{Number of Resolved } SIRs} \quad (35)$$

The Average Age of Active SIRs metric allows users to measure the time SIRs remain active in the system, as an indicator of a project's performance. The formula for calculating the Average Age of Active SIRs metric is expressed below in Equation (36):

$$\text{Average Age of Active } SIRs = \frac{\sum \text{Number of Days Active for Active } SIRs}{\text{Number of Active } SIRs} \quad (36)$$

Returning again to FIG. 3, the base measures are sorted into excluded base measures and non-excluded base measures (step S307). Since metrics provide an interpretation the underlying project base measures, the value of a metric, or the outcome of a model may be compromised if the project data is aberrant or incorrect. In this regard, the approved reviewer entity may designate base measures as non-excluded base measures, for example where the base measures represent common cause variation data, or excluded base measures, for example where the base measures represent special cause variation data. Since special cause variation, or variation cause by unexpected events, may not be helpful when used in calculating baselines or thresholds, the approved reviewer entity may exclude this aberrant data from future calculations and comparisons. One example user interface for implementing the sorting process is described infra, with regard to FIG. 33.

Sorting of data occurs via an authorized approval entity once the entity has reviewed the data and marked it as either non-excluded ('accepted'), or excluded ('rejected'). For a rejected metric, the approval entity may provide comments in a status summary field, so that the comments may be viewed by the project team and be used for discussion or improvements.

Organizational baseline data is imported (step S309), and an organizational indicator is calculated based on the non-excluded base measures and the organizational baseline data (step S310). Generally, a 'baseline' includes data serving as a basis, particularly one of a known measure or position used, such as one used in surveying or navigation, to calculate or locate something. In the context of this disclosure, the baseline data is not necessarily workplan baseline data or CM baseline data, but is rather 'metric baseline' data indicative of a statistically calculated measure of process capability. By 'organizational,' it is intended that the baseline be data associated with or denoted by a particular organization, and not necessarily, for example, with one particular contract or project. Organizational baseline data may be imported manually, by typing in baseline data, or automatically, by wired or wirelessly downloading baseline data from a data server such as data server 103.

The baseline data may include an average value and control limits that are calculated using the variation of the process. Within the organization, a metric which has an indicator associated with it is considered to be under statistical process control, and is said to be quantitatively managed. These metrics may implement corrective action notation and documentation whenever the process performance falls outside of the control limits. Furthermore, an 'organizational indicator' is a baseline that has been calculated using the organizational baseline data from across the entire organization, to be used by projects across the entire organization. For comparison, a 'project baseline' is a baseline that has been calculated using data from one project for use on that one project.

The organizational indicator includes 'control limits,' which are statistically calculated values based upon the organizational baseline values, where the control limits may be incorporated, for example, into within a control chart to manage a process performance. Control limits are but one management tool used within a control chart, where the values are statistically calculated based upon a the given data set, and are roughly three standard deviations from the average. The organizational indicator may also include other limits, such as an upper control limit ("UCL") and a lower control limit ("LCL"). The QPI Measurement Program may incorporate control limits, and average data, as an organizational indicator.

The valid metric and at least a portion of the base measures are approved via the authorized approval entity, thereby generating an approved metric and approved base measures, respectively (step S311). Approval of the data may be performed by an authorized approval entity once per metric cycle, although approval may occur more or less frequently. In various implementations, the authorized approval entity approves one base measure at a time, or all the base measures at time, or some subset of the total number of base measures, depending upon, for example, the time when the base measure was entered, the category of the base measure, the identity of the writer, or other factors. In one example implementation, a base measure is approved if, on face value, it has a value within pre-ascertained thresholds and requires no further comment or justification and, conversely, a base measure is not approved if the value requires further justification or comments on corrective actions from the writer. One example user interface for implementing the approval process is described infra, with regard to FIG. 32.

The valid metric or the approved metric, and the organizational indicator are output (step S312). The outputting of the valid metric and the organizational indicator may occur in real-time to receiving the base measures, or at some other time. Outputting the valid metric or the approved metric, and the organizational indicator may further include generating a report including the valid metric or the approved metric, and the organizational indicator, and/or displaying a representation of the valid metric or the approved metric, and the organizational indicator, such that the representation may display the valid metric or the approved metric, and the organizational indicator over a plurality of metric periods. Approving the base measures may further include comparing the base measures to the organizational baseline data, receiving a corrective action from the authorized write entity, based upon comparing the base measures to the organization baseline, and accepting an approval indicia from the authorized approval entity after a corrective action is received. The 'corrective action' may describe acts or deeds used to remedy a situation, remove an error, or adjust a condition.

Although the outputting of valid metrics and approved metrics is described in detail in FIGS. 13 to 25, infra, it is initially noted that each of the metrics are capable of being displayed a page where a CPI graph is viewed, GOU baselines are viewed, contract limits are added or removed, and corrective actions are added, modified or removed. Metrics may be output textually, such as via a table, graphically, such as via a chart, or using other audio or visual means.

Figure 13:
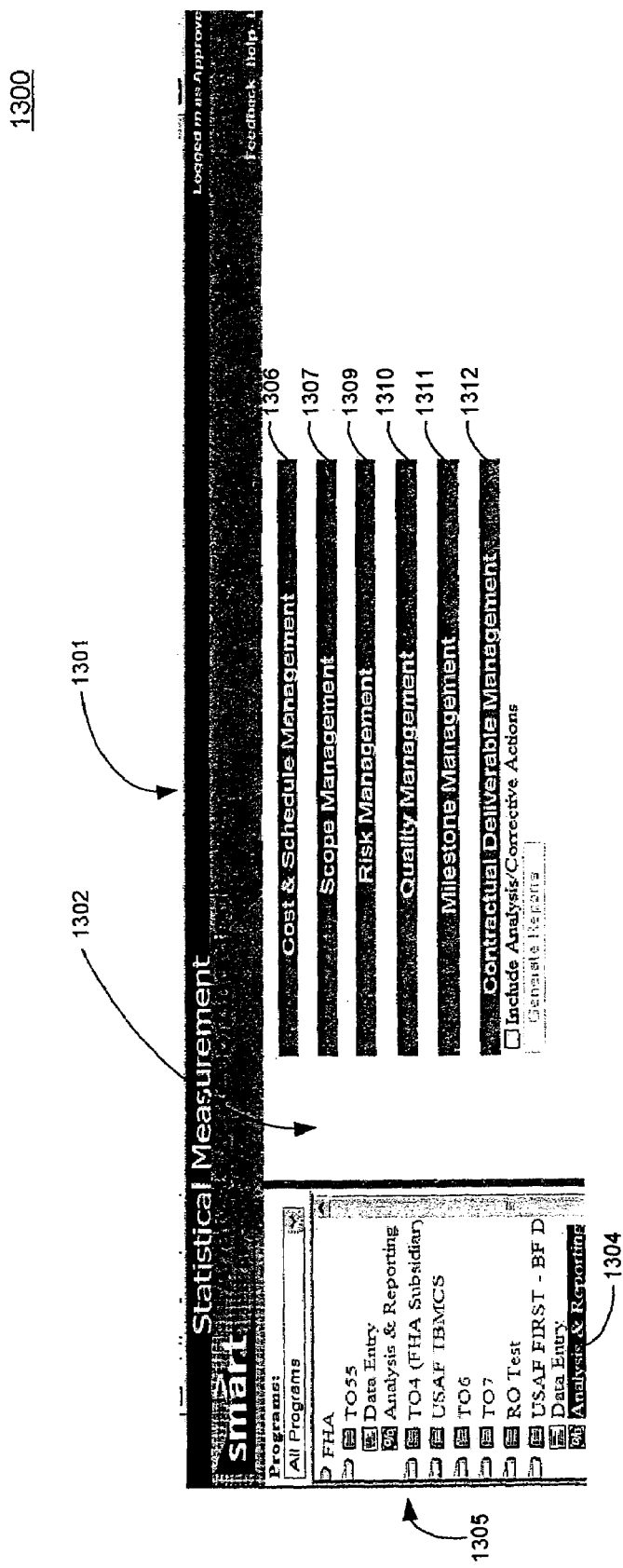
FIG. 13 depicts an example user interface for outputting valid or approved metrics and organizational indicators.

FIG. 13 depicts an example user interface 1300, which is used by a computer executing the enhanced measurement analysis and reporting application, for outputting valid or approved metrics and organizational indicators. In more detail, an 'Analysis & Reporting' selection page 1301 is displayed in a content pane 1302 when the 'Analysis & Reporting' node 1304 is selected in a navigation pane 1305. Users with all permissions, such as authorize write entities, authorized approval entities, authorized review entities, and others, may access the 'Analysis & Reporting' page 1301.

'Analysis & Reporting' page 1301 displays a list of all available metrics, in a 'Cost & Schedule' Management category 1306, a Scope Management category 1307, a Risk Management category 1309, a Quality Management category 1310, a Milestone Management category 1311, a Contractual Deliverable Management category 1312, a Performance Management category 1312, and/or other categories. For certain project types, displayed categories will be based upon available or valid metrics. All categories may be displayed, by default, as unexpanded panels.

Figure 14:
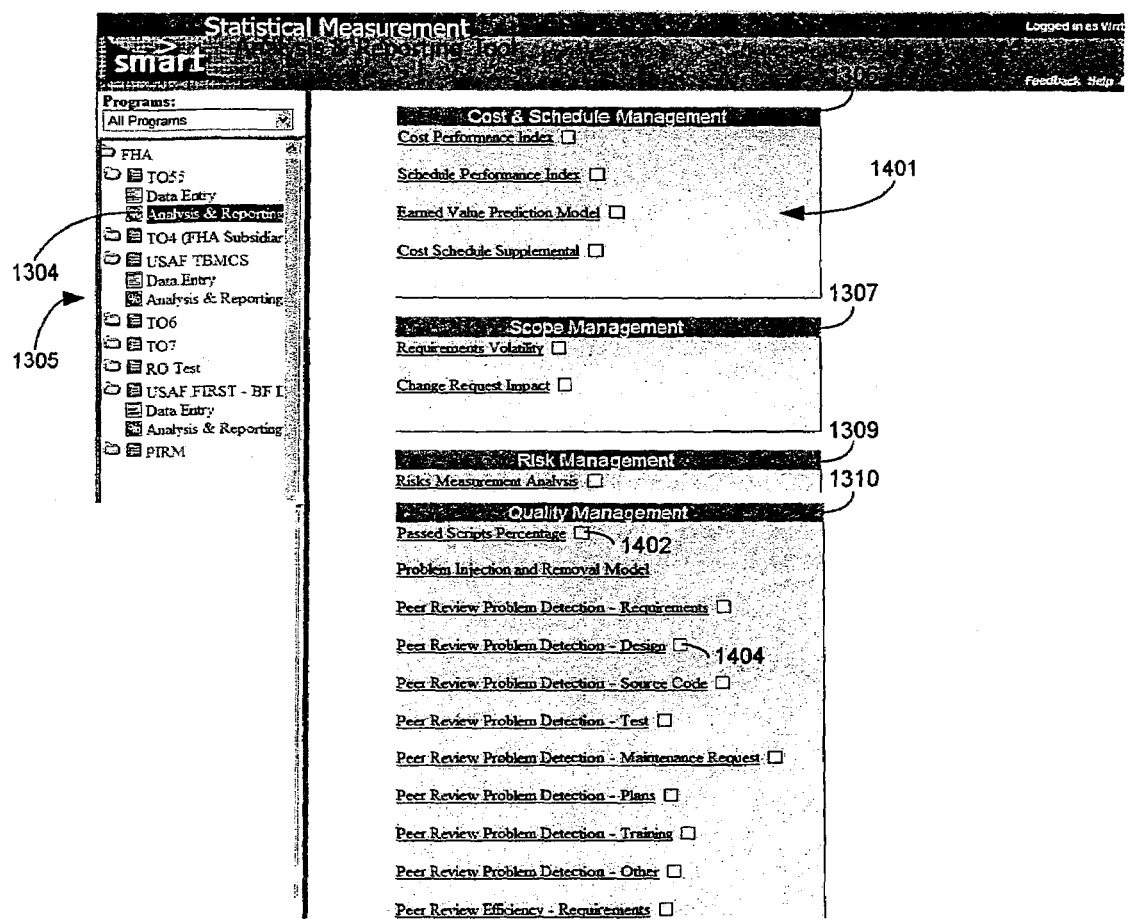
FIG. 14 depicts the user interface of FIG. 13, in a state where each category panel is expanded.

FIG. 14 illustrates user interface 1300, in a state where each category panel is expanded. When expanded, each panel, such as panel 1401, displays links to a specific 'Measurement & Analysis' page. 'Measurement & Analysis' pages are pages where a metric or set of metrics is displayed in a format such that a user may analyze the data, or examine the metric data to gauge and understand project performance. 'Measurement & Analysis' pages may have functionality which allows a viewing user to enter a corrective action and/or track status.

Users desiring to view information on more than one metric at a time may select controls, such as check-box controls

1402 and 1404, to view multiple metrics in one report. Reports may be generated for one or more metrics, and are a read-only view of the 'Measurement & Analysis' pages selected. Regardless of whether a user chooses to view each metric separately or in a consolidated report, the user is also able to choose whether to view corrective actions with each metric.

According to one implementation, the first time a 'Measurement & Analysis' page is accessed, the user may enter project-specific control limits for that metric and perform an analysis of the data output in order to enter a corrective action, thereby manually importing organizational baseline data. Corrective actions are not necessarily generated by the enhanced measurement analysis and reporting application.

Figure 15:
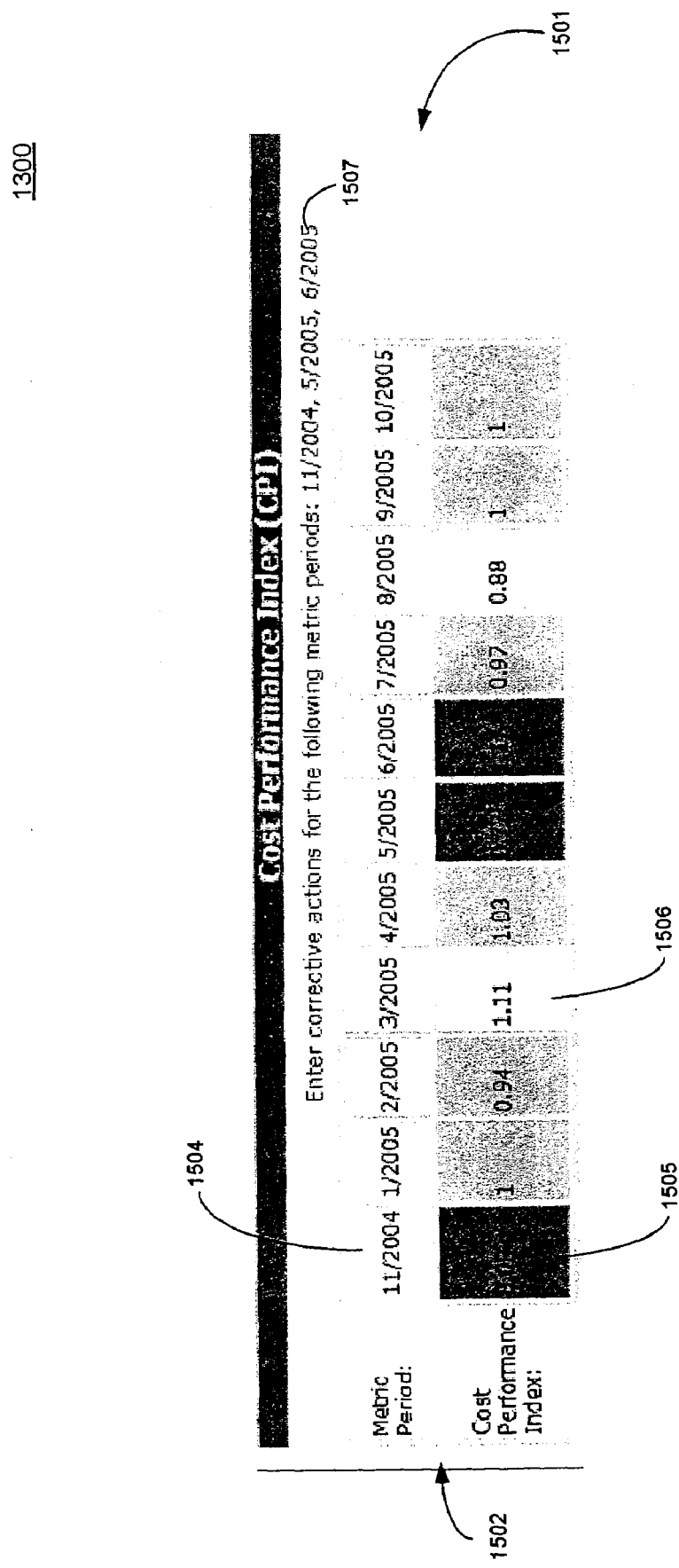
FIG. 15 depicts the user interface of FIG. 13, in a state where a Cost Performance Index ("CPI") metric is displayed.

FIG. 15 illustrates the user interface 1300, in a state where a CPI metric is displayed. In particular, the user interface 1300 includes a metric output page 1501, which outputs a table 1502 displaying metric periods, and cost performance index data associated with each metric period. For example, a cell 1504 displays the date '11/2004' corresponding to a metric period of Nov. 1, 2004 to Nov. 30, 2004. A cell 1505 displays a calculated metric value of "0.08," associated with the November 2004 metric period. The cells 1505 and 1506 are highlighted differently from each other, to provide the user with an easy visual interpretation of the cell values. In one implementation, highlighting occurs using a 'stoplight' highlighting approach, where data highlighted in green is considered well within thresholds, data highlighted in yellow is considered within thresholds but nearing a value which is outside of thresholds, and data highlighted in red is considered outside of thresholds.

A call-out 1507 further indicates that appropriate corrective action should be performed or otherwise documented for calculated metric values which fall outside of predefined thresholds. Projects may include user-definable contract limits, such as baseline, specification or threshold limits, which aid in the interpretation of the data. If corrective action should be entered, the user has the ability to add corrective actions, and 'close' further action to calculated metric data, for the appropriate metric periods. Corrective actions may also be edited or deleted, as appropriate. A 'threshold' is a data-driven measure of process capability which may be calculated using historical data, however a threshold is not ordinarily determined using the same statistical rigor as a control limit or other organizational indicator. In particular, threshold limits may be based on past process performance, and do not require the same amount of analysis as quantitatively managed metrics.

Figure 16:
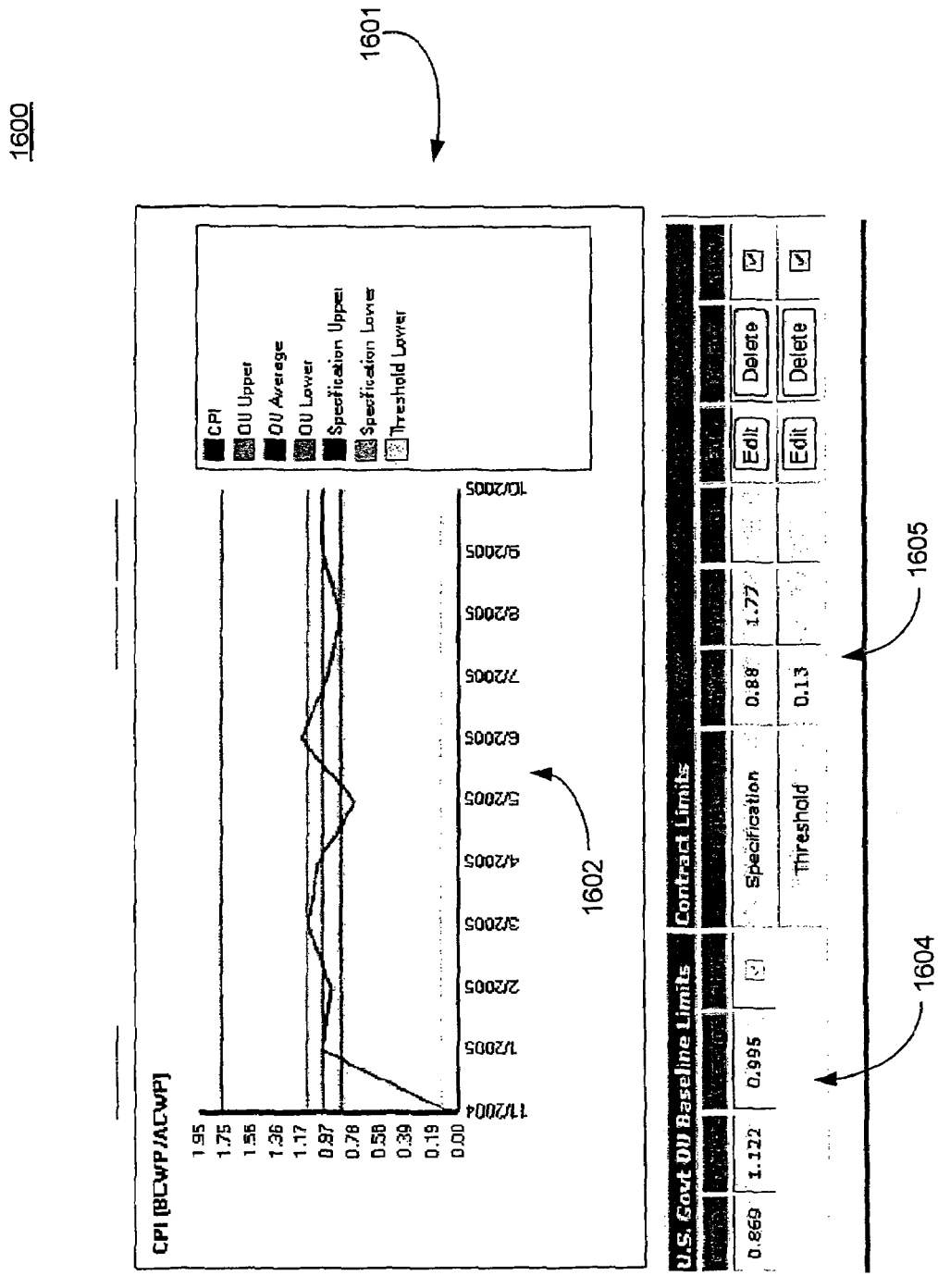
FIG. 16 depicts an example user interface for displaying CPI data.

FIG. 16 depicts an example user interface 1600, which is used by a computer executing the enhanced measurement analysis and reporting application, for displaying CPI data. In particular, user interface 1600 includes 'Measurement & Analysis' page 1601 which displays CPI graph 1602, predefined U.S. GOU baseline limits 1604, and user-modifiable contract limits 1605.

Figure 17:
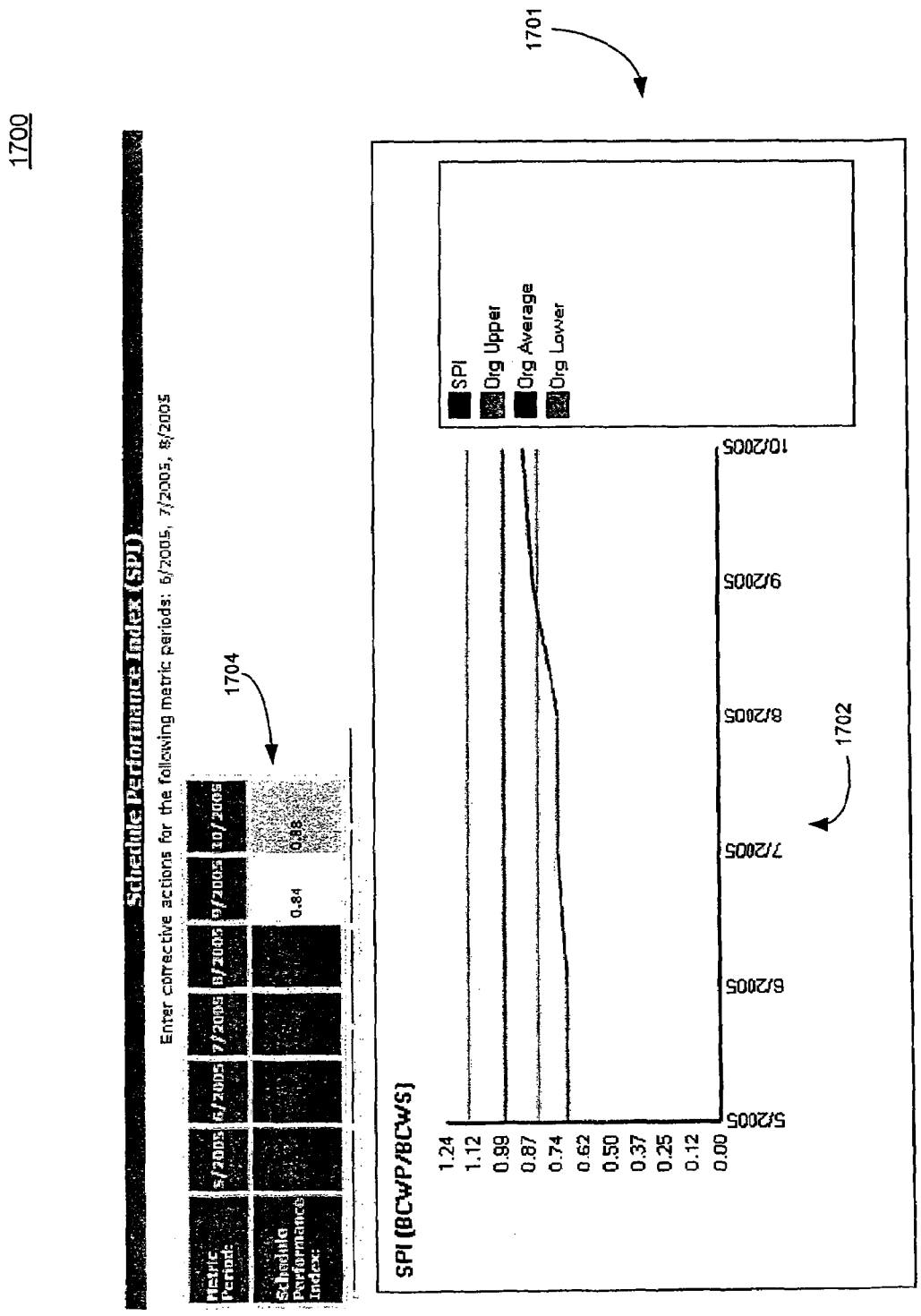
FIG. 17 depicts an example user interface for displaying SPI data.

FIG. 17 depicts an example user interface 1700, which is used by a computer executing the enhanced measurement analysis and reporting application, for displaying SPI data. In particular, user interface 1700 includes 'Measurement & Analysis' page 1701 which graphically displays SPI graph 1702, and SPI metric value table 1704.

FIG. 18 depicts an example user interface 1800, which is used by a computer executing the enhanced measurement analysis and reporting application, for displaying 'Cost & Schedule' Supplemental metrics. The 'Cost & Schedule' Supplemental metrics aid in determining whether a project will be on-time and on-budget. User interface 1800 includes 'Cost & Schedule' page 1801, which outputs metric values in table 1802. For each metric period, metric values include TCPI metric values, CV metric values, SV metric values, P-ETC metric values, P-EAT metric values, P-VAC metric values, S-ETC metric values, S-EAC metric values, S-VAC metric values, and/or other metric values.

Figure 19:
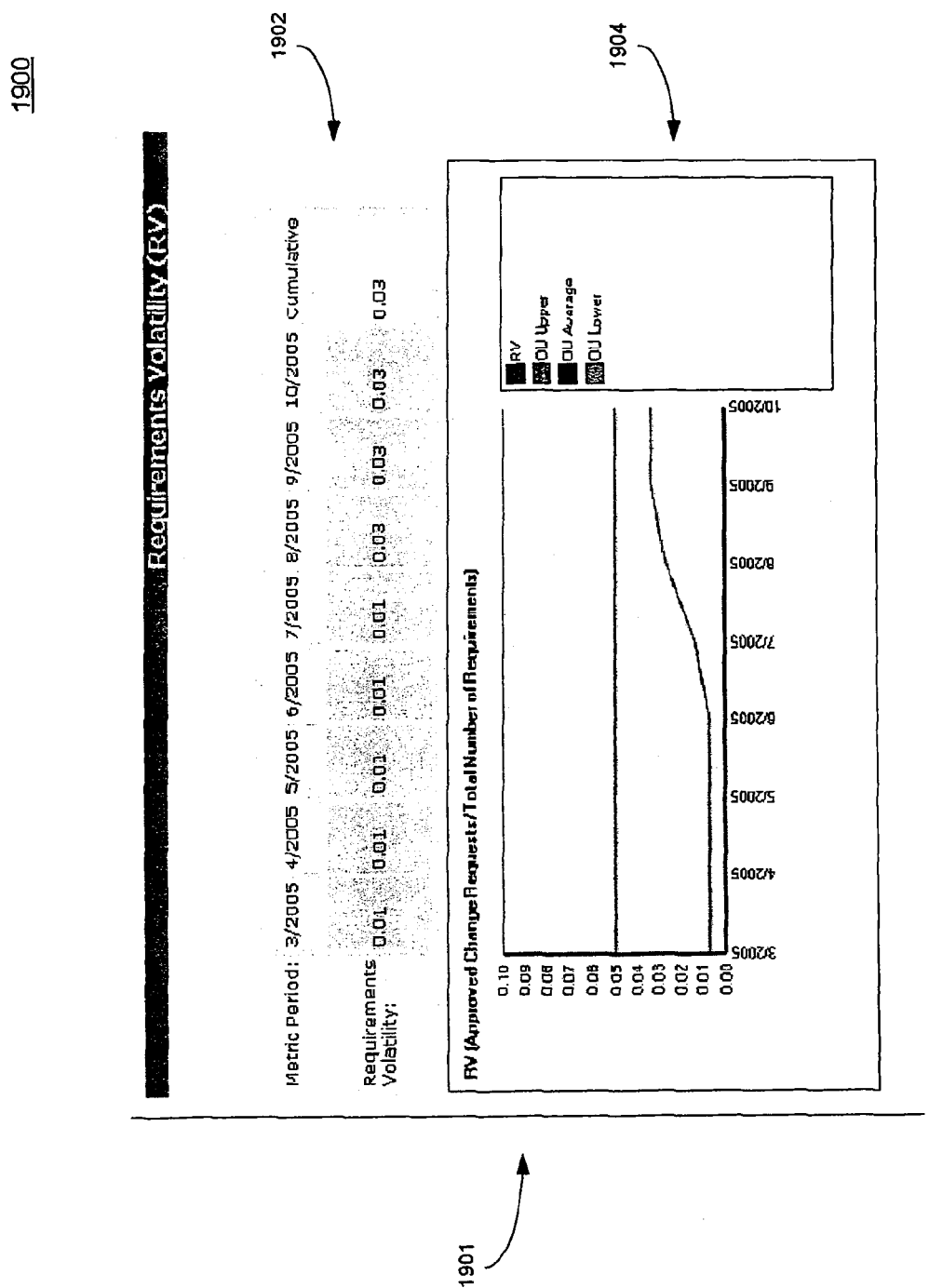
FIG. 19 depicts an example user interface for displaying a Requirements Volatility metric.

FIG. 19 depicts an example user interface 1900, which is used by a computer executing the enhanced measurement analysis and reporting application, for displaying a Requirements Volatility metric. User interface 1900 includes Requirements Volatility 'Measurement & Analysis' page 1901, which outputs metric values textually in a table 1902 and graphically in a chart 1904.

Figure 20:
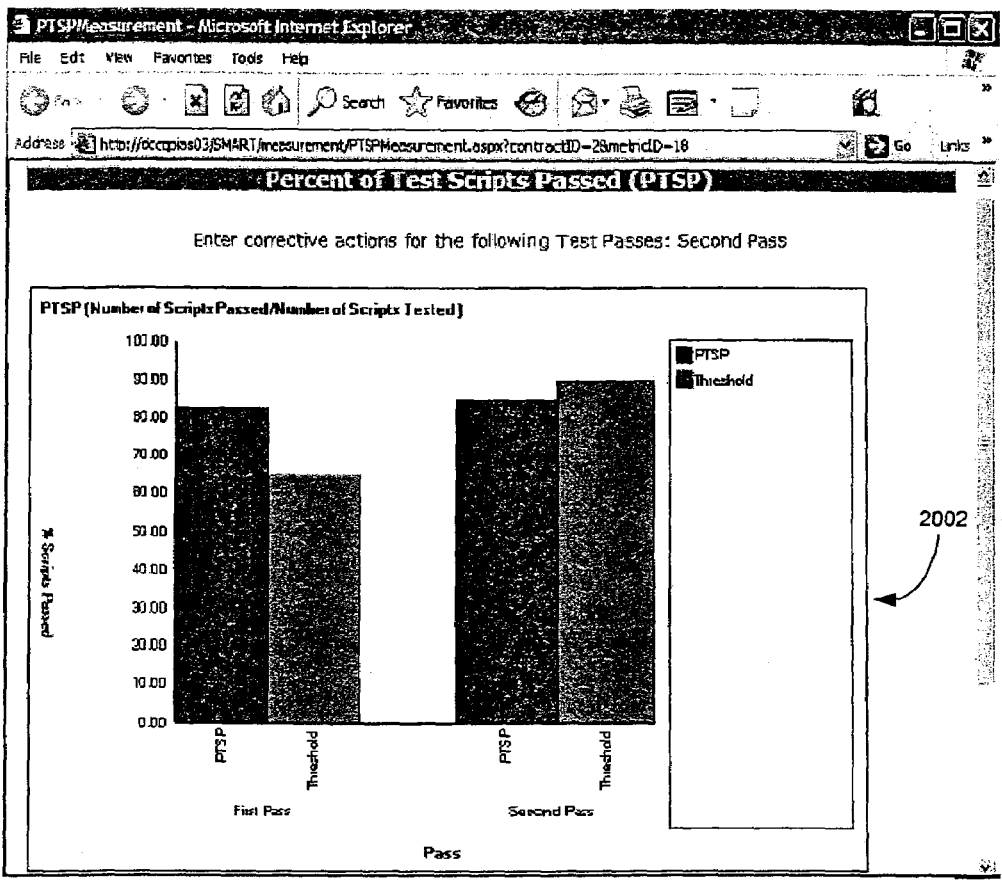
FIG. 20 depicts an example user interface for displaying a Percent Of Test Scripts Passed metric.

FIG. 20 depicts an example user interface 2000, which is used by a computer executing the enhanced measurement analysis and reporting application, for displaying a Percent Of Test Scripts Passed metric. User interface 2000 includes Percent Of Test Scripts Passed 'Measurement & Analysis' page 2001, which outputs metric values graphically in a chart 2002, and textually in a table 2004.

Figure 21:
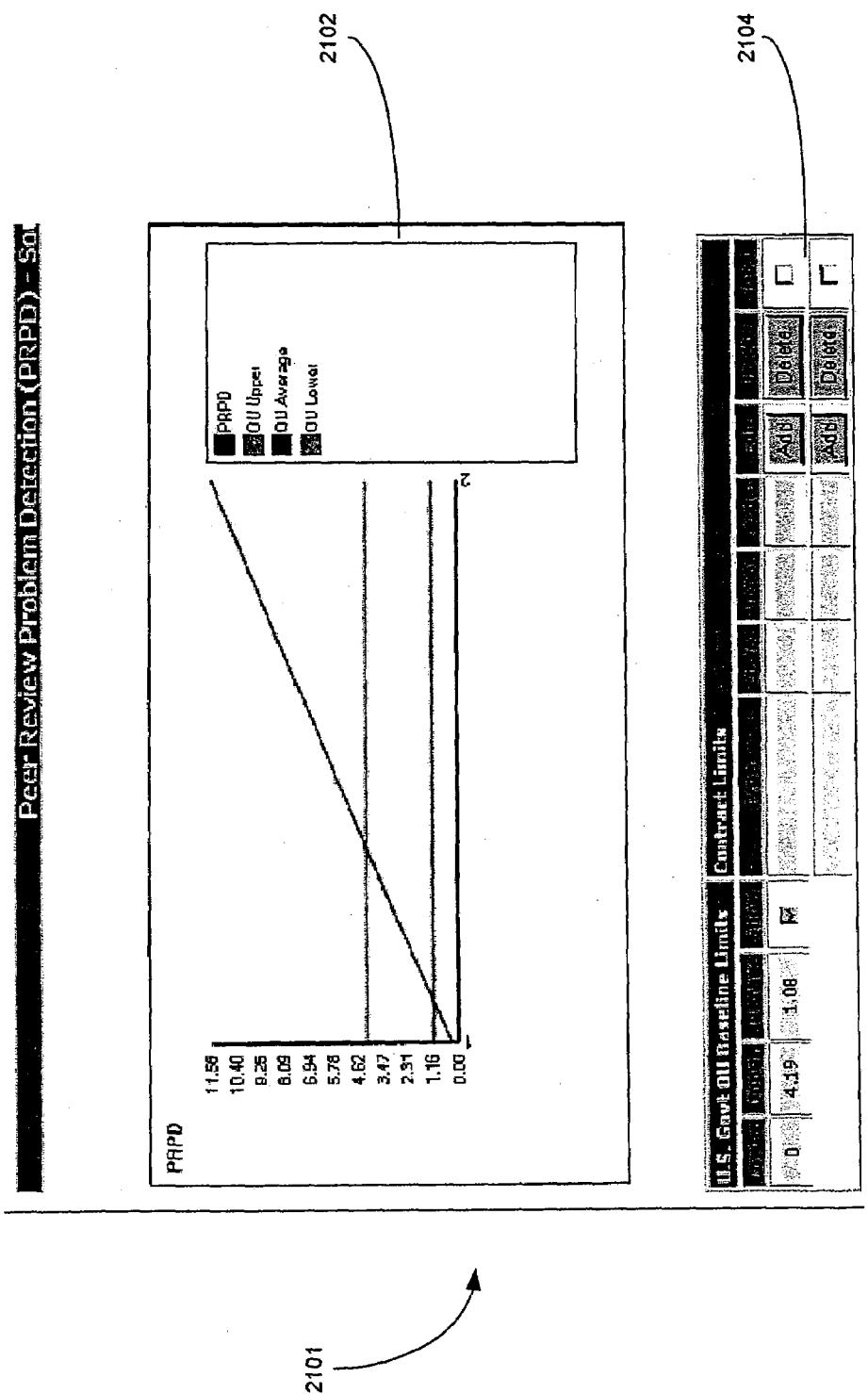
FIG. 21 depicts an example user interface for displaying a Peer Review Problem Detection metric.

FIG. 21 depicts an example user interface 2100, which is used by a computer executing the enhanced measurement analysis and reporting application, for displaying a Peer Review Problem Detection metric. In one implementation, a plurality of Peer Review Problem Detection pages exist, each displaying a Peer Review Problem Detection metric one or more of 'Requirements,' 'Design,' 'Source Code,' 'Test,' 'Maintenance Request,' 'Plans,' 'Training Materials,' and 'Other.' The user interface 2100 includes one such Peer Review Problem Detection 'Measurement & Analysis' page 2101, which outputs metric values graphically in a chart 2102, and textually in a table 2104.

Figure 22:
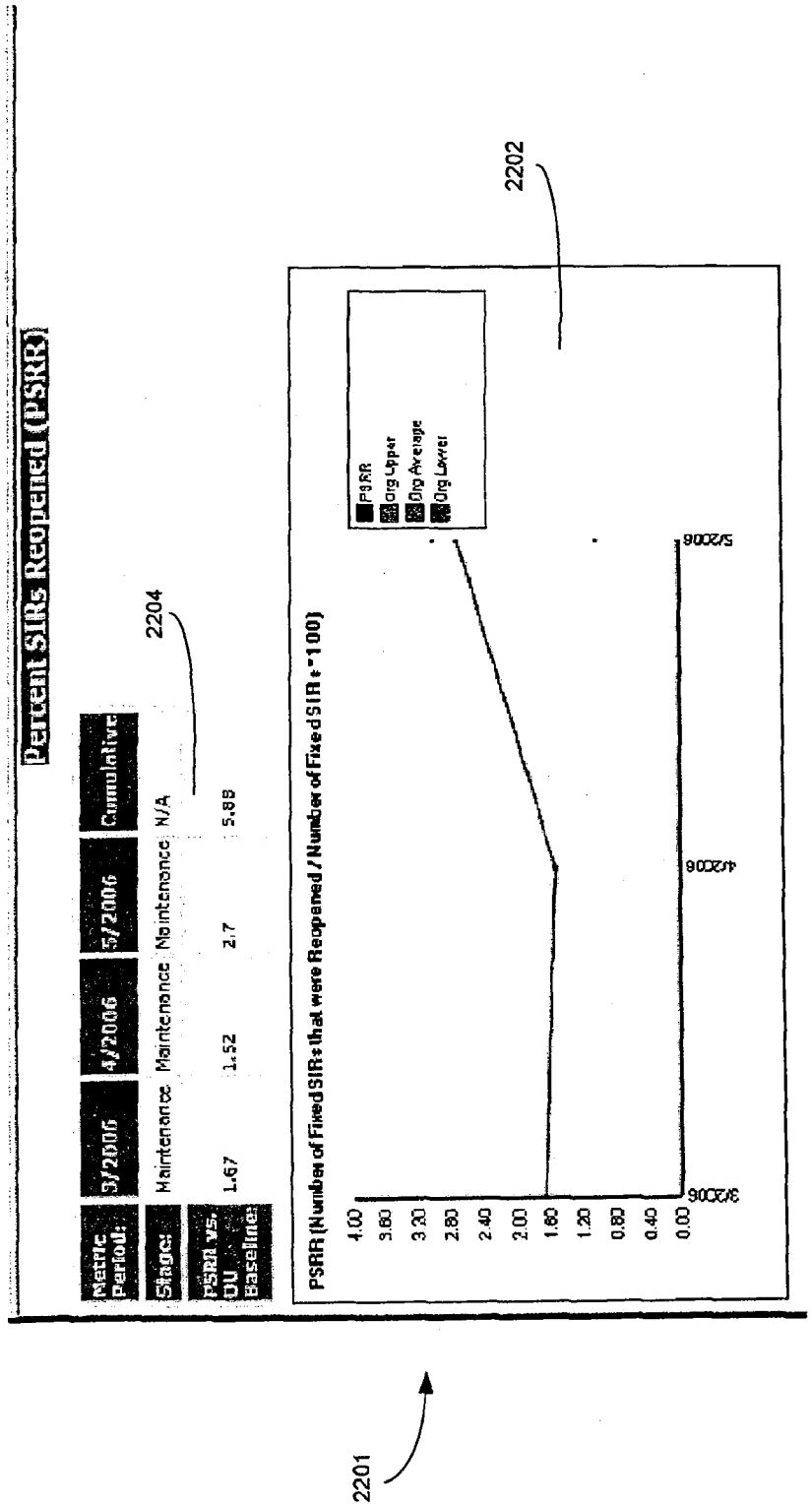
FIG. 22 depicts an example user interface for displaying a Percent SIRS Reopened metric.

FIG. 22 depicts an example user interface 2200, which is used by a computer executing the enhanced measurement analysis and reporting application, for displaying a Percent SIRs Reopened metric. User interface 2200 includes Percent SIRs Reopened 'Measurement & Analysis' page 2201, which outputs metric values graphically in a chart 2202, and textually in a table 2204.

Figure 23:
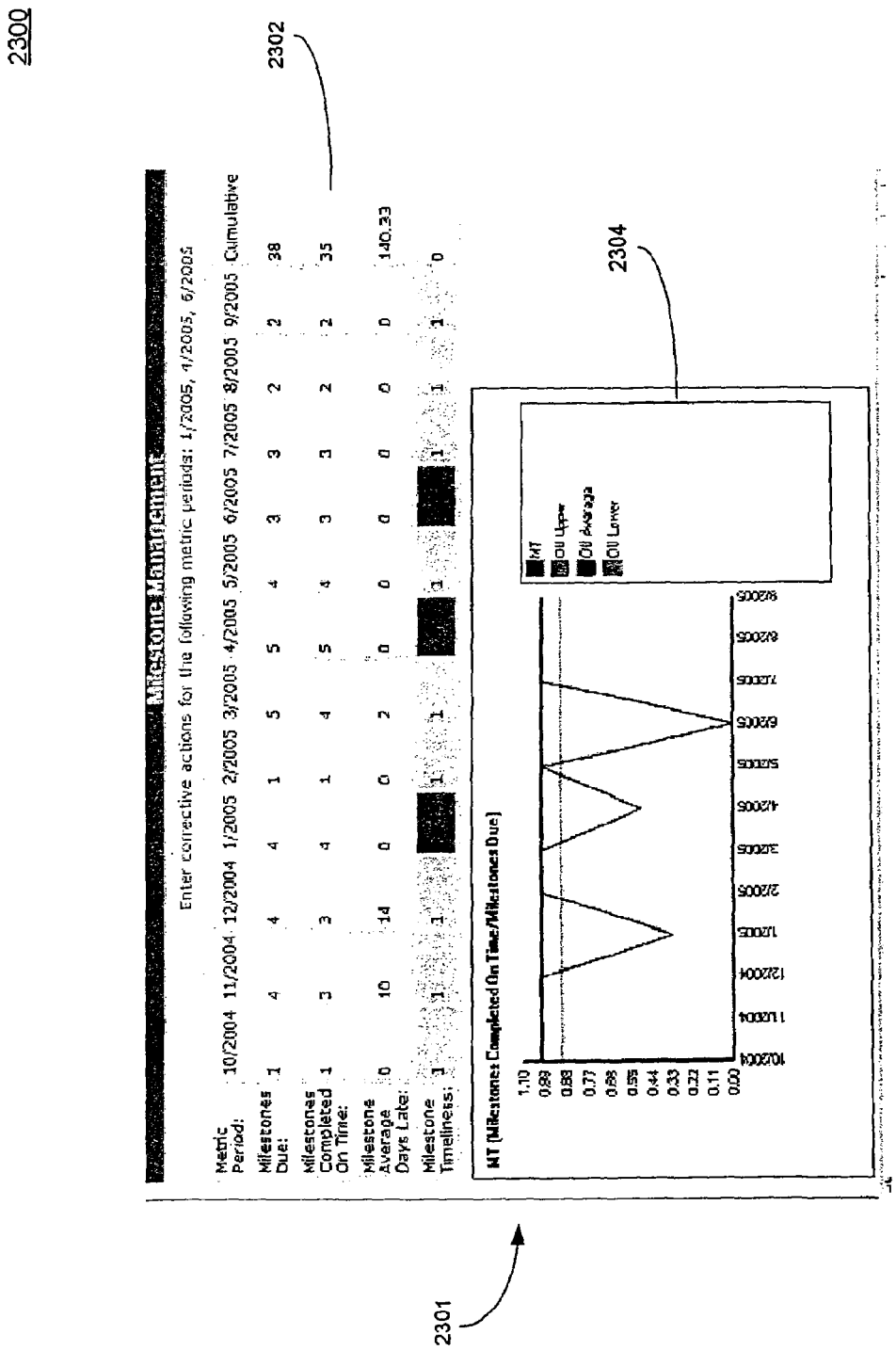
FIG. 23 depicts an example user interface for displaying a Milestone Management category metric.

FIG. 23 depicts an example user interface 2300, which is used by a computer executing the enhanced measurement analysis and reporting application, for displaying a Milestone Management category metric. User interface 2300 includes Milestone Management 'Measurement & Analysis' page 2301, in which the user may view, modify, or remove Milestone Timeliness metrics or graphs, Average Days Late metrics, GOU limits, contract limits, and corrective actions. As shown in Milestone Management chart 2302, the Milestone Timeliness metric may be highlighted, such as with red or green shading. Timeliness is determined by taking the number of milestones met to date and dividing it by the number of milestones which have been scheduled to date. Timeliness may then be compared to project-specific upper and lower control limits if they have been added. Whenever the metric period cell is highlighted, indicating that a calculated value is out-of-bounds, a user is prompted to enter corrective actions for that metric period.

Figure 24:
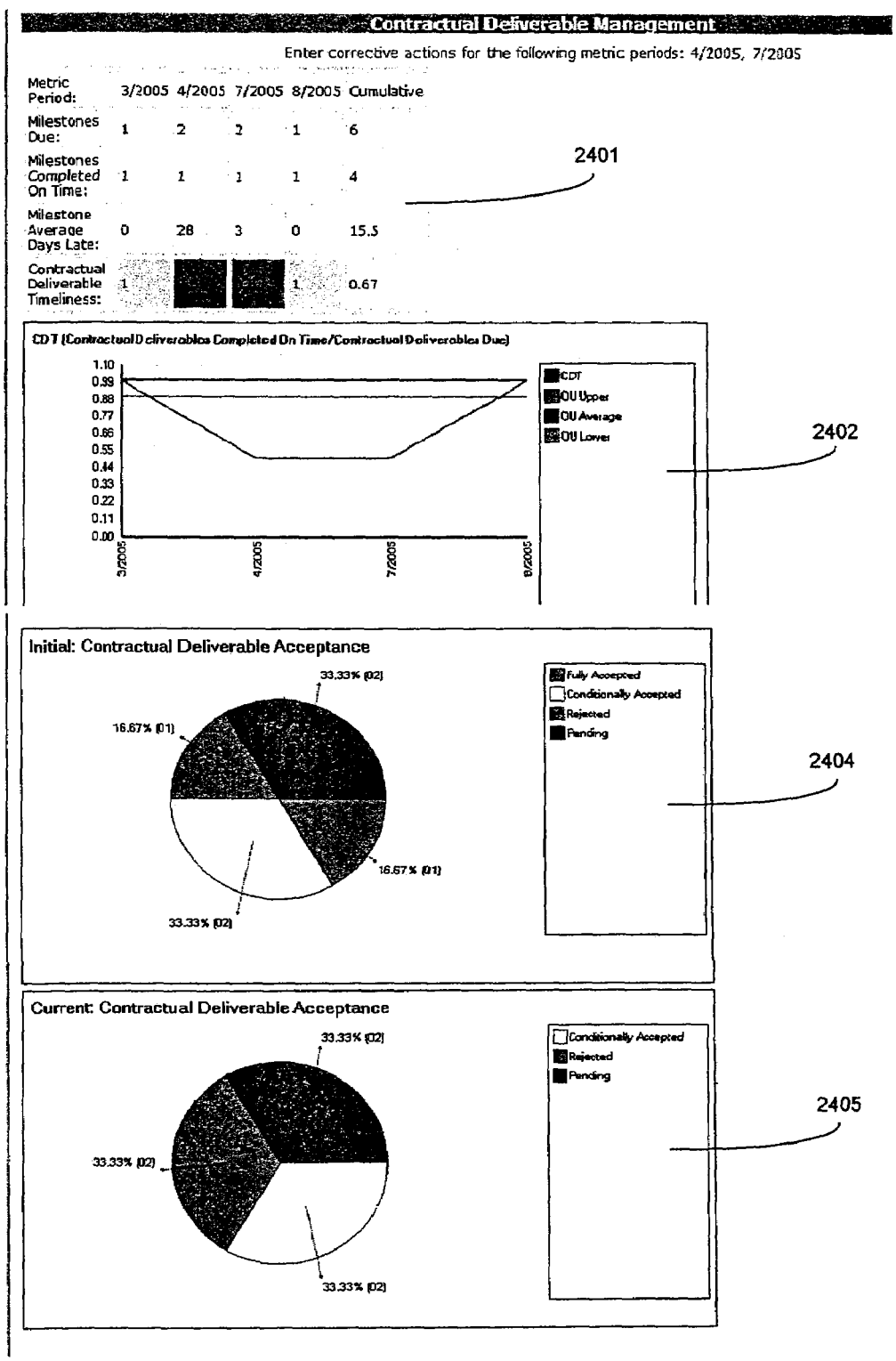
FIG. 24 depicts an example user interface for displaying a Contractual Deliverable Management category metric.

FIG. 24 depicts an example user interface 2400, which is used by a computer executing the statistical measurement and analysis reporting tool for displaying a Contractual Deliverable Management category metric. The Contractual Deliverable Management category metrics include the Contractual Deliverable Timeliness metric, the Contractual Deliverable Average Days Late metric, the Contractual Deliverable Acceptance metric, and other metrics. On the user interface 2400, users may view the data across various metric periods, either graphically or textually. In addition, GOU baselines may be viewed, and contract limits and corrective actions may be added, modified or removed.

The user interface 2400 allows a user to determine how often contractual deliverables submitted by a project are being completed on time, versus those contractual deliverables which are behind schedule. The user interface 2400 includes a table 2401, in which metrics displayed textually across several metric periods, with metrics highlighted as appropriate to denote values which are above range, below range, or in range. A chart 2402 displays metric data indicative of Contractual Deliverable Timeliness ("CDT"), a chart 2404 displays metric data indicative of initial contractual deliverable acceptance, and a chart 2405 displays metric data indicative of current contractual deliverable acceptance.

Figure 25:
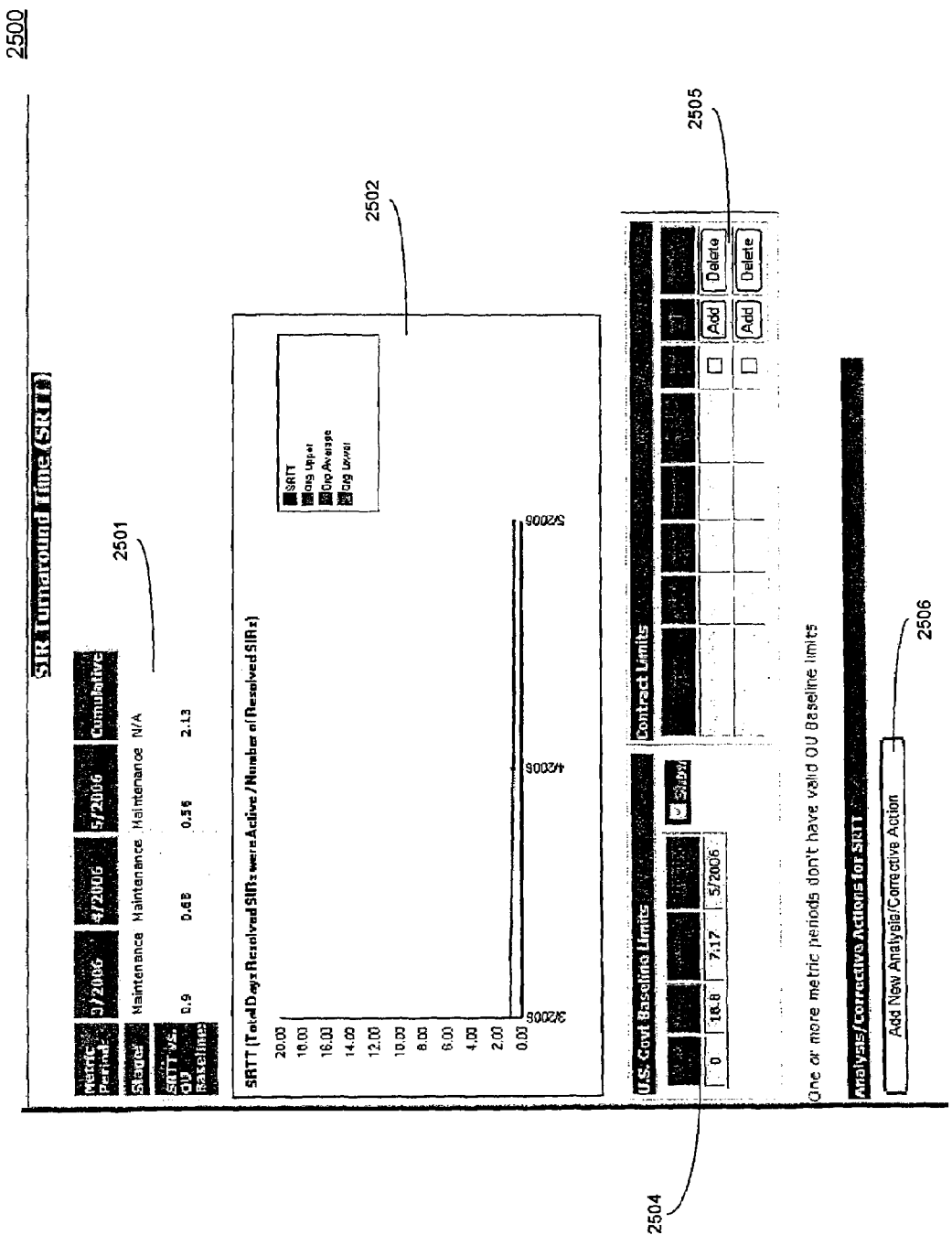
FIG. 25 depicts an example user interface for displaying the SIR Turnaround Time metric.

FIG. 25 depicts an example user interface 2500, which is used by a computer executing the statistical measurement and analysis reporting tool for displaying the SIR Turnaround Time metric. In particular, the user interface 2500 includes a table 2501, in which SIR Turnaround Time metric data is displayed textually across several metric periods, with metric data highlighted as appropriate to denote values which are above range, below range, or in range. A chart 2502 graphically displays data indicative of the SIR Turnaround Time metric, and tables 2504 and 2505 display GOU and contract limits, respectively. A user is allowed to enter an analysis or corrective action by selecting control 2506.

Returning to FIG. 3, internal model parameters are adjusted based upon user preferences or the periodic base measures (step S314). Models such as PIRM may include a dynamic model which uses historical project base measures, such as the number of errors and defects found in each stage, in generating a model. If a dynamic model is used, internal model parameters are adjusted based upon historical project base measures, such as the received periodic and aperiodic base measures. If the model is static model, the user may also manually adjust other model parameters as necessary. For instance, base measures may be entered into data input fields including override effectiveness percentages analyze, design, build, test or deploy fields, where override percentages are adjusted when a project has sufficient historical data on its ability to find and remove problems. The adjustment of model parameters may be omitted, as necessary.

A model is generated based upon the approved base measures, a modeling algorithm, and internal model parameters (step S315). The model may be a problem injection and removal model ("PIRM"), a request turnaround prediction ("RTP") model, or an earned value prediction ("EVP") model.

The EVP model graphically displays a prediction of a project's end date and cost at completion, using entered base measures, such as 'Cost & Schedule' metric data. Project manager may, for example, use the EVP model to determine when corrective action is necessary in order to deliver a project on-time and on-budget.

The PIRM displays a project's project injection and removal rate as compared with expected injection rates based upon industry standard data ('static PIRM') or a project -under-scrutiny's own past performance ('dynamic PIRM') The PIRM displays a chart which shows the number of predicted versus actual number of problems found and removed per stage of work and the variance, expressed as a percentage.

The PIRM assists project managers by translating the number of problems that are found using the peer review process and the problems or SIR reporting process, and comparing these numbers to the average number of problems expected based on the size of the project. The size of the project is either the planned or actual number of requirements and the level at which those requirements are defined, or the project's BCAC. The requirements level of detail may be specified using a high, medium or low level of detail. Project managers may then look at the variance between the number of problems found versus the number expected to be found, completing a root cause analysis when the project numbers are outside of an expected range. Finding problems early-on in the system development lifecycle reduces the costs associated with fixing those same problems in a later phase. One assumption of the PRIM is that finding and eliminating problems early will also improve the quality of the systems and solutions delivered, and assist projects in achieving the goals of delivering high-quality projects.

Figure 26:
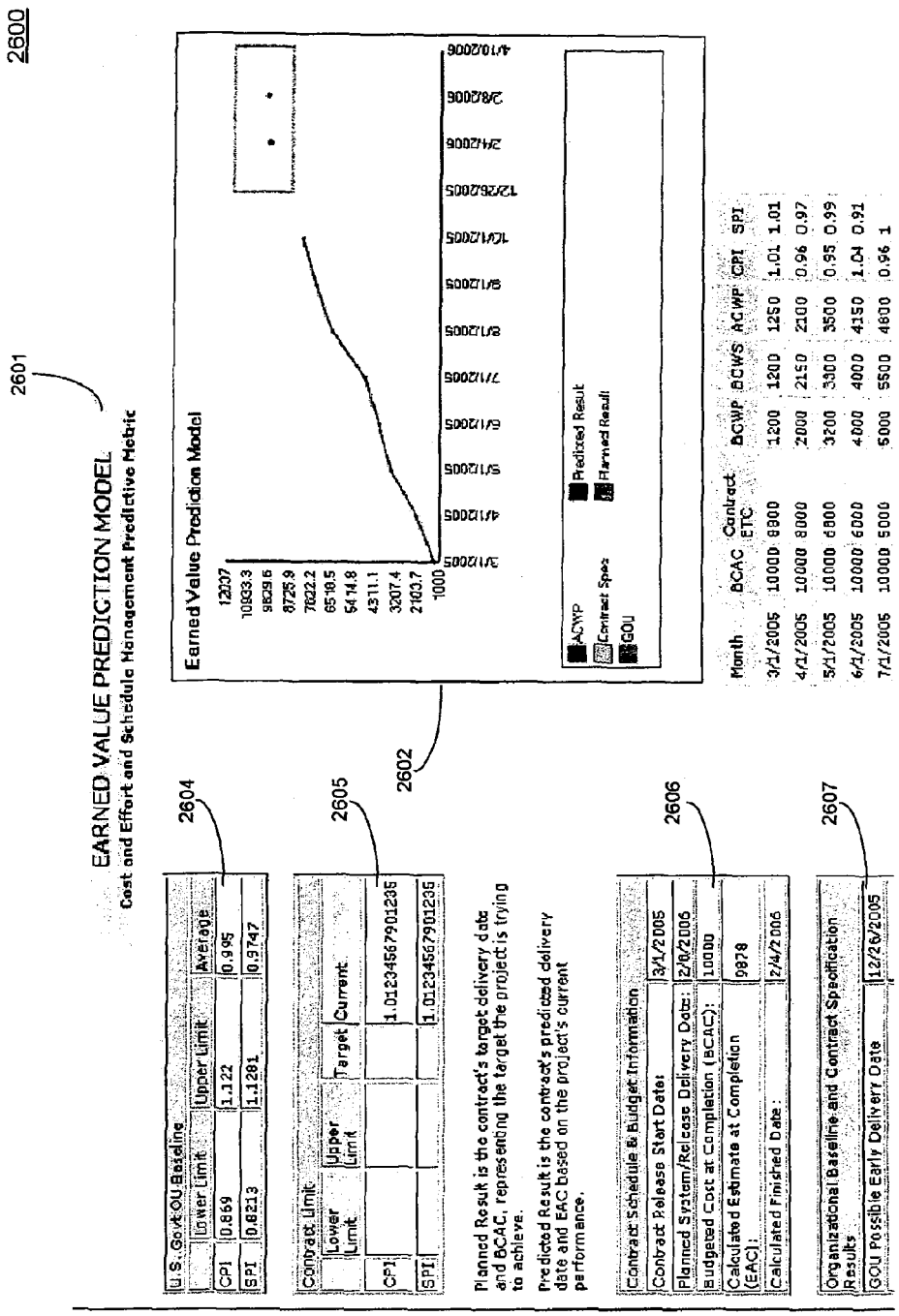
FIG. 26 depicts an example user interface for outputting an EVP model.

The model is output (step S316), ending method 300 (step S317). FIG. 26 depicts an example user interface 2600, which is used by a computer executing the enhanced measurement analysis and reporting application, for outputting an EVP model. In particular, user interface 2600 includes EVP model 'Measurement & Analysis' page 2601 which graphically displays EVP model data using EVP graph 2602, and displays pre-defined U.S. GOU baseline limits 2604, and user-modifiable contract limits 2605. EVP model 'Measurement & Analysis' page 2601 also outputs contract 'Schedule & Budget' information 2606 and organizational baseline data and contract specification results 2607 generated by the EVP model.

Figure 27:
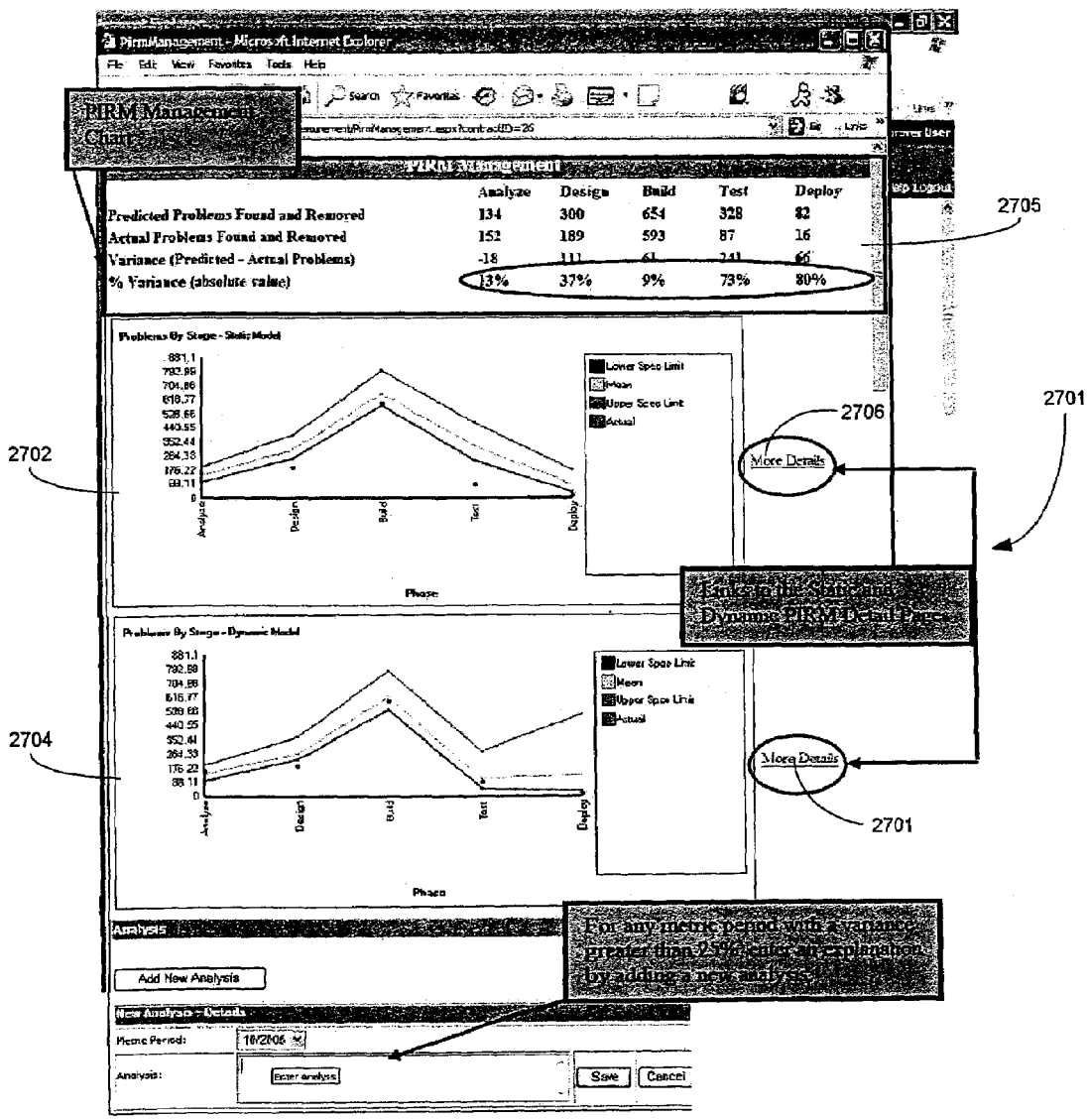
FIG. 27 depicts an example user interface for outputting a PIRM model.

FIG. 27 depicts an example user interface 2700 which is used by a computer executing the statistical measurement analysis and reporting tool, for outputting a PIRM model. In particular, user interface 2700 includes PIRM 'Measurement & Analysis' page 2701 which graphically displays PIRM data using static PIRM graph 2702 and/or dynamic PIRM graph 2704, and also displays a PIRM management chart 2705 which outputs selected base measurements and/or metrics which affect the PIRM. By selecting control 2706 or 2707, additional details of the static PIRM or dynamic PIRM viewed, respectively.

Figure 28:
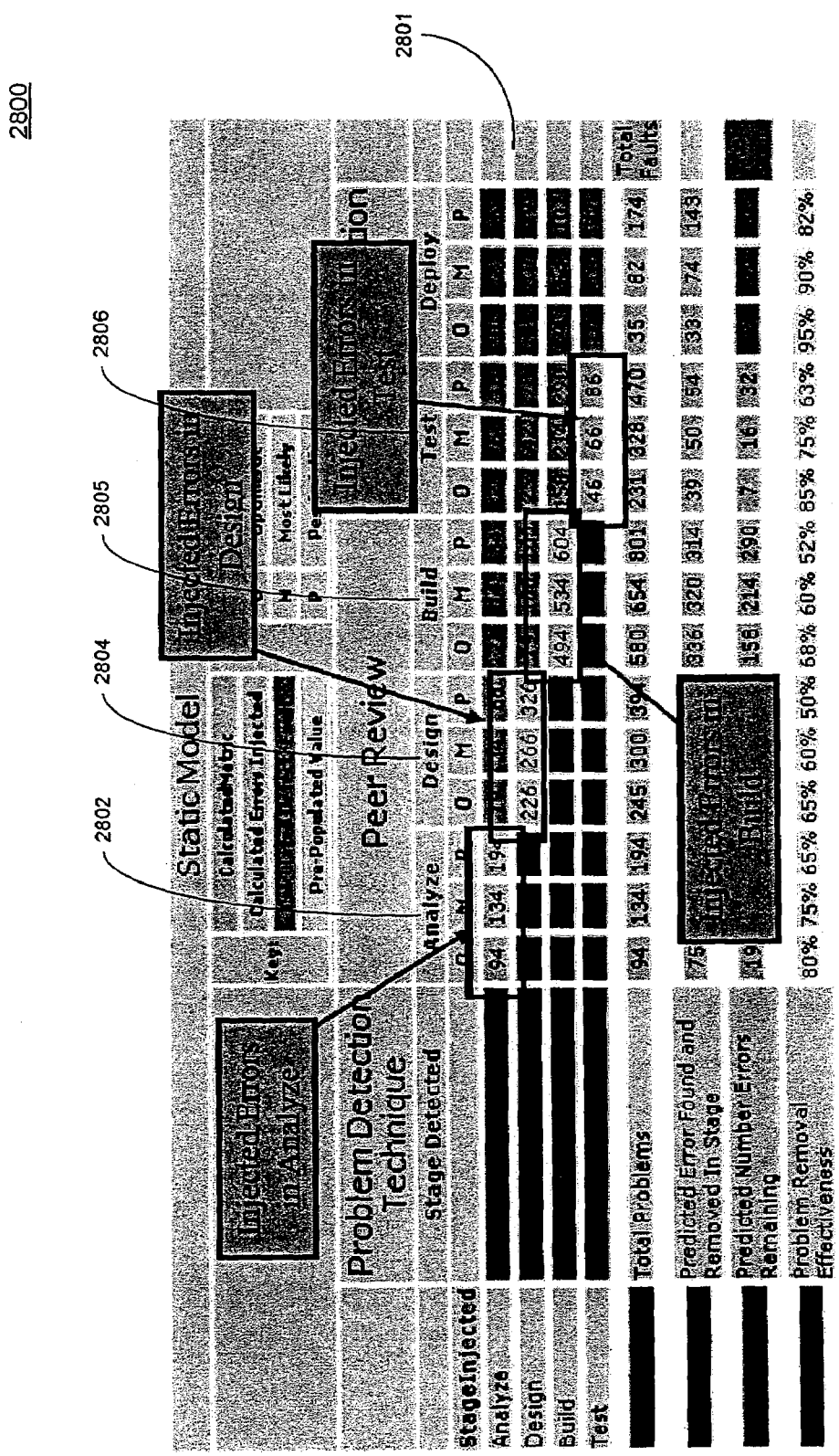
FIG. 28 depicts the user interface of FIG. 27, in a state after a user requests details of the PIRM static model.

FIG. 28 depicts a PIRM Details-Static Model page 2801, which is displayed when a user selects control 2806 using user interface 2700. Page 2801 includes a plurality of cells which display base measure or metric values associated with static PIRM. In particular, cells 2802 display data associated with errors injected in the analyze phase, cells 2804 display data associated with errors associated in the design phase, cells 2805 display data associated with errors associated in the build phase, and cells 2806 display data associated with errors associated in the test phase.

Figure 29:
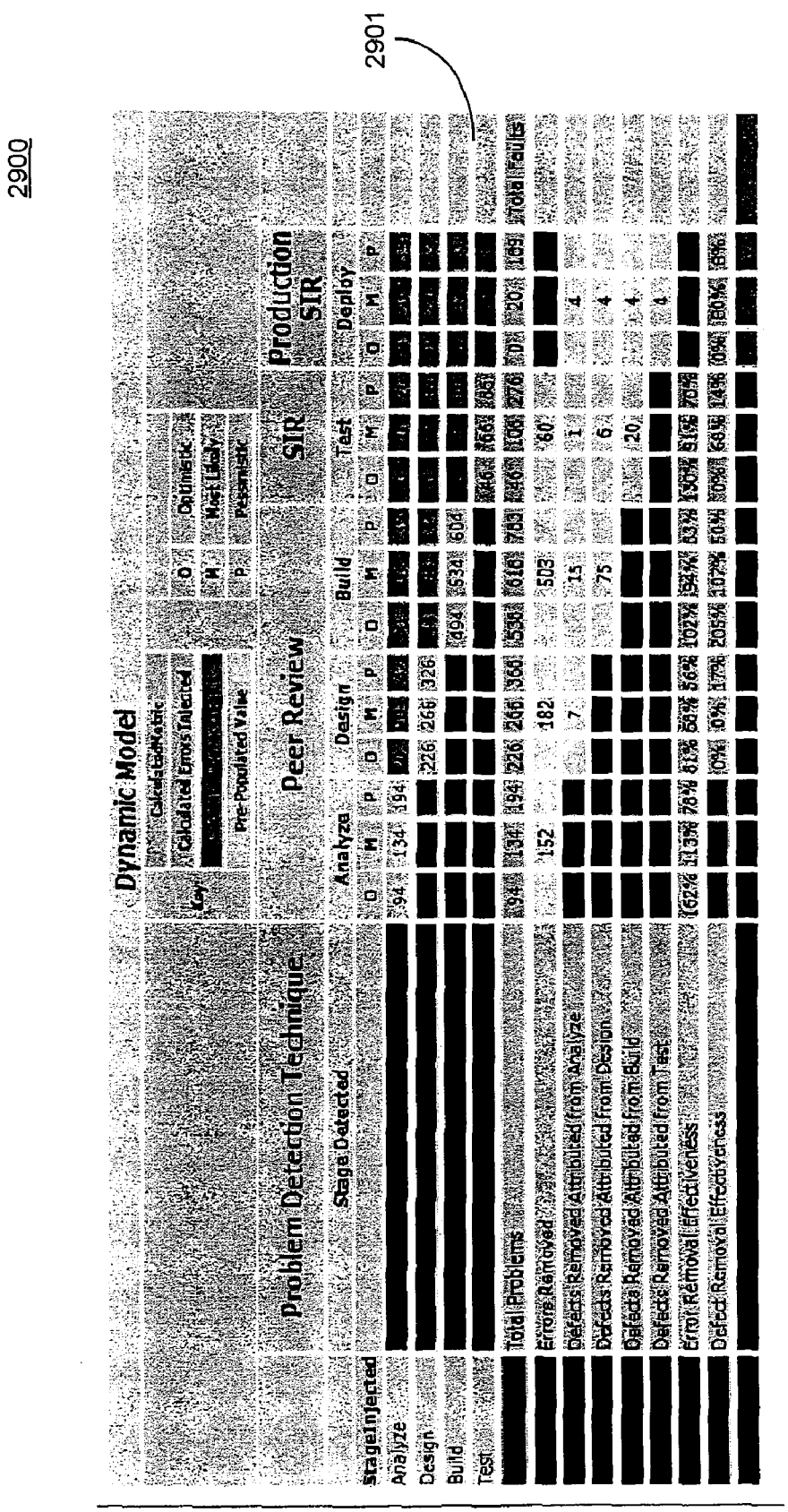
FIG. 29 depicts the user interface of FIG. 27, in a state after a user requests details of the PIRM dynamic model.

FIG. 29 depicts a PIRM Details-Dynamic Model page 2901, which is displayed when a user selects control 2907 using interface 2700. Page 2901 includes a plurality of cells which display base measures or metric values associated with dynamic PIRM.

Figure 30:
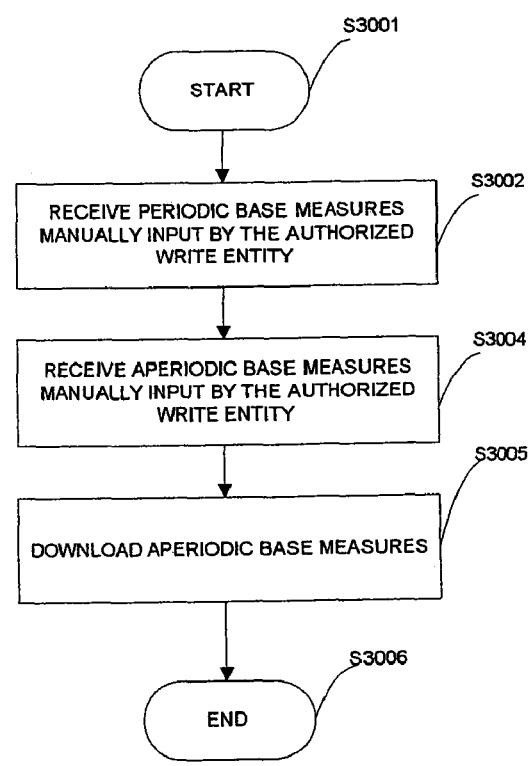
FIG. 30 is a flowchart illustrating the manual and/or automatic reception of base measures.

FIG. 30 is a flowchart illustrating the manual and/or automatic reception of base measures. In more detail, when method 3000 begins (step S3001), periodic base measures which were manually input by the authorized write entity are received (step S3002). If no periodic base measures are to be received, step S3002 is omitted. Aperiodic base measures manually input by the authorized write entity are also received (step S3004). If no aperiodic base measures are to be received, step S3004 is omitted. An example user interface used for the manual entry of base measures has been described, supra, with regard to FIGS. 7 and 9.

Aperiodic base measures are downloaded (step S3005), and method 3000 ends (step S3006). If no aperiodic base measures are to be downloaded, step S3005 is omitted. An example user interface used for the automatic downloading of aperiodic base measures has been described, supra, with regard to FIG. 8.

Figure 31:
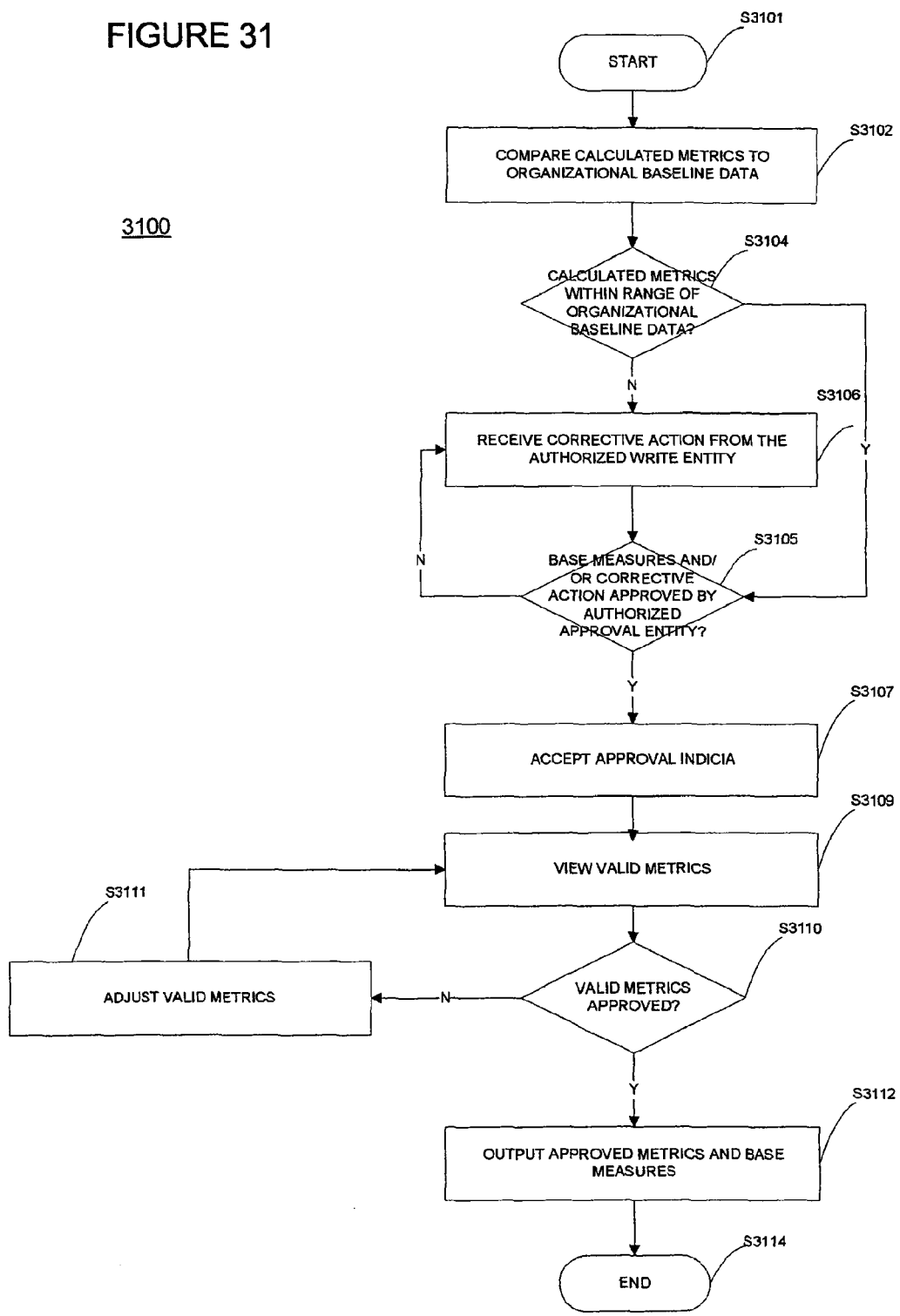
FIG. 31 is a flowchart illustrating the approval of base measures and metrics.

FIG. 31 is a flowchart illustrating the approval of base measures and metrics. In more detail, method 3100 begins (step S3101), and calculated metrics are compared to organizational baseline data (step S3102). If the calculated metrics are within range of the organizational baseline data (step S3104), it is determined whether the corresponding base measures are approved by an authorized approval entity (step S3105). If the calculated metrics are not within range of the organizational baseline data (step 3104), corrective action is received from the authorized write entity (step S3106), and it is determined whether the base measure and/or corrective action are approved by the authorized approval entity (step S3105).

If it is determined (at step S3105) that the base measure and/or corrective action are not approved by the authorized approval entity, additional corrective action is received from the authorized write entity (step S3106), and it is once again determined if the authorized approval entity approves the base measure and additional corrective action (step S3105, et seq.).

If it is determined (at step S3105) that the base measure and/or corrective action are approved by the authorized approval entity, an approval indicia from the authorized approval entity is accepted (step S3107). The valid metrics are viewed (step S3109), and it is determined if the valid metrics are approved by the authorized approval entity (step S3110). If the valid metrics are approved, the approved base measures and metrics are output (step S3112), and method 3100 ends. If the valid metrics are not approved, the valid metrics are adjusted (step S3111) and viewed (step S3109, et seq.).

FIG. 32 depicts an example user interface 3200 which is used by a computer executing the statistical measurement analysis and reporting tool, for approving base measures and valid metrics, thereby generating approved metrics and approved base measures. In particular, an approval page 3201 on the user interface 3200 includes tabs each base measure category, such as Metric Period Data Input tab 3202. Once per metric period, for example, the authorized approval entity may select base measures to approve by selecting a metric period control 3204 and/or a stage control 3205 to select appropriate unapproved base measures. Valid unapproved base measures, such as the base measure displayed in field 3206 are displayed to the authorized approval entity for review, where a base measure is approved if it has a value within a known thresholds and requires no further comment or justification. The authorized approval entity may indicate approval of a particular base measure by selecting an 'approve' control 3207. If a base measure includes justification, corrective action or other comments from the authorized write entity, these comments are displayed in a comments text box control 3209. on corrective actions from the writer. The authorized approval entity may accept the comments displayed in the comments text box control 3209 by selecting an 'accept' control 3210.

Figure 33:
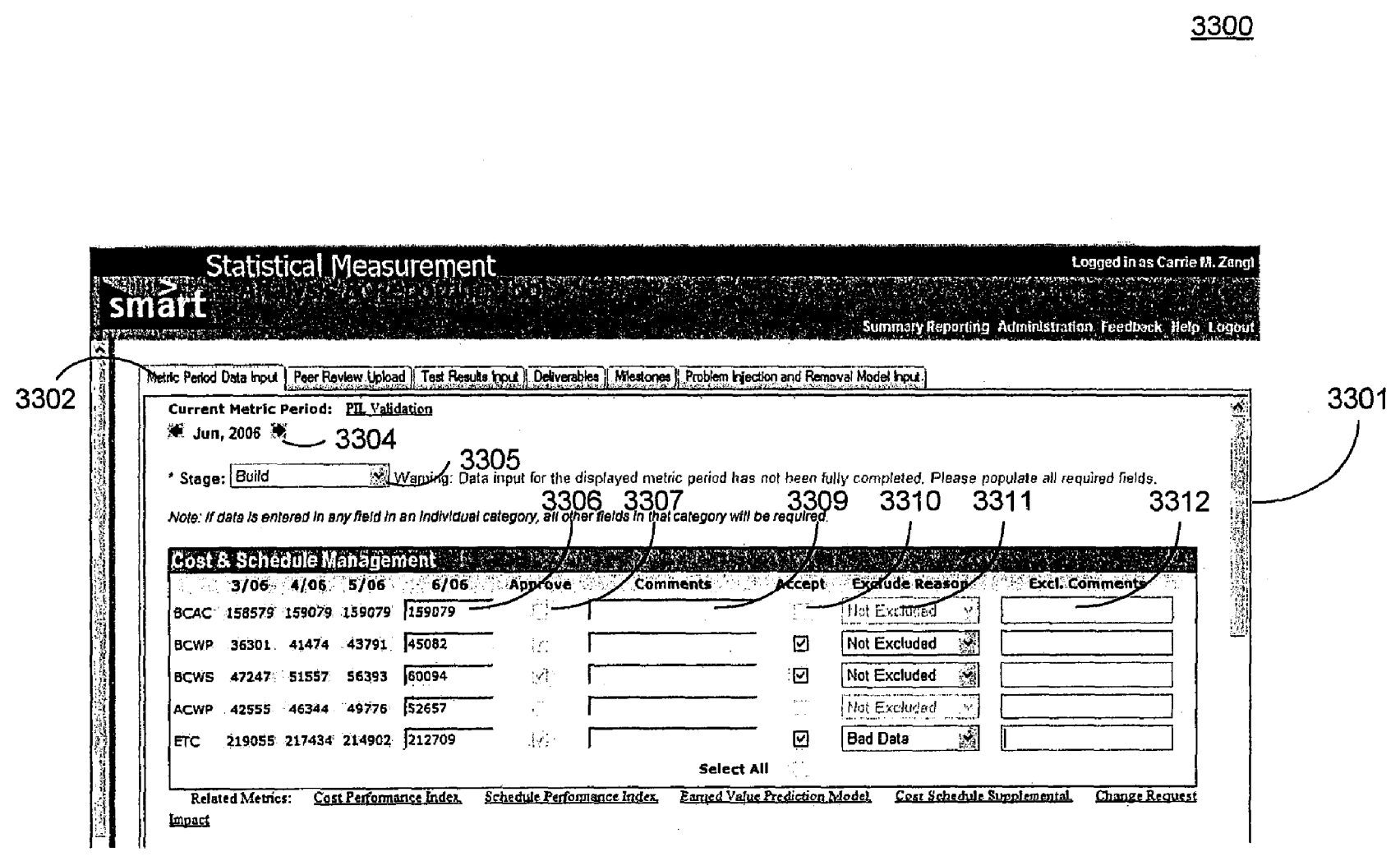

FIG. 33 depicts an example user interface 3300 which is used by a computer executing the statistical measurement analysis and reporting tool, for sorting base measures into excluded base measures and non-excluded base measures. A sorting page 3301 on the user interface 3300 also includes tabs for each base measure category, such as Metric Period Data Input tab 3302. The authorized review entity may select base measures to approve by selecting a metric period control 3304 and/or a stage control 3305 to select appropriate unsorted base measures. Base measures, such as the base measure displayed in field 3306, are displayed to the authorized review entity for sorting, where the approved reviewer entity may designate base measures as non-excluded base measures if the base measures represent common cause variation data, or as excluded base measures if the base measures represent special cause variation data. If the base measure has been approved by an authorized approval entity, the approval will appear via a 'approve' control 3210, associated comments will appear in a comments text box control 3309, and an acceptance indicia will appear via a 'accept' control 3310. If the authorized review entity determines that the base measure is to be sorted as non-excluded, the 'non-excluded' tag is selected by a 'exclude reason' control 3311. If the authorized review entity determines that the base measure is to be sorted as excluded, an exclusion reason is selected in the 'exclude reason' control 3311

To its advantage, statistical measurement analysis and reporting in which projects, such as projects participating in the U.S. GOU and ANSS QPI programs, are provided with an interactive web-based application, for the reporting and analysis of project measurement data. In particular, contract information may be recorded, measurement data for monthly metrics, test results, deliverables, milestones, service level agreements, and models may entered, and peer reviews may be downloaded. Furthermore, measurement and analysis charts, graphs, and tables may be viewed with corrective actions and operating unit and project limits displayed, metric data output may be analyzed, project control limits may be set, and corrective actions may be entered. Moreover, metrics reports may be created based upon user selections, and data entered.

According to another general implementation, a computer program product, tangibly stored on a computer-readable medium, includes instructions to be performed by a computer, the instructions operable to cause the computer to receive project information relating to a project, the project information identifying a project type, an authorized write entity, and an authorized approval entity and select a valid metric based at least on the project type, the valid metric measuring an aspect of performance of the project. The instructions are also operable to receive base measures corresponding to the valid metric from the authorized write entity, the base measures further including periodic base measures corresponding to at least one metric period, and aperiodic base measures corresponding to an aperiodic incident, and calculate the valid metric based on the base measures. The instructions are further operable to sort the base measures into excluded base measures and non-excluded base measures, import organizational baseline data, and calculate an organizational indicator based on the non-excluded base measures and the organizational baseline data. Moreover, the instructions are operable to approve the valid metric and at least a portion of the base measures via the authorized approval entity, thereby generating an approved metric and approved base measures, respectively, and output the valid metric or the approved metric, and the organizational indicator.

According to another general implementation, a system includes an input unit, a processor unit, and an output unit. The input unit is configured to receive project information relating to a project, the project information identifying a project type, an authorized write entity, and an authorized approval entity, receive base measures corresponding to a valid metric from the authorized write entity, the base measures further including periodic base measures corresponding to at least one metric period, and aperiodic base measures corresponding to an aperiodic incident, import organizational baseline data, and approve the valid metric and at least a portion of the base measures via the authorized approval entity, thereby generating an approved metric and approved base measures, respectively. The processor unit is configured to select the valid metric based at least on the project type, the valid metric measuring an aspect of performance of the project, calculate the valid metric based on the base measures, sort the base measures into excluded base measures and non-excluded base measures, and calculate an organizational indicator based on the non-excluded base measures and the organizational baseline data. The output unit is configured to output the valid metric or the approved metric, and the organizational indicator.

A number of embodiments of the invention have been described. Nevertheless, it will be understood that various modifications may be made without departing from the spirit and scope of the invention. Accordingly, other embodiments are within the scope of the following claims.

What is claimed is:

1. A method comprising:
receiving project information that identifies a type of a project, an authorized write entity for the project, and a different, authorized approval entity for the project;
selecting a metric that is valid for the project type, the metric measuring an aspect of performance of the project;
receiving, through interaction with the authorized write entity, base measures that are used to calculate a value for the metric, the base measures including both periodic base measures corresponding to at least one metric period, and aperiodic base measures corresponding to an aperiodic incident;
calculating the value for the metric using the periodic base measures and the aperiodic base measures;
sorting the base measures into excluded base measures that represent common cause variation, and non-excluded base measures that represent special cause variation;
importing organizational baseline data that is used to calculate an organizational indicator, the organizational baseline data including data that is not specific to the project or to any other single project;
calculating the organizational indicator using the non-excluded base measures and the organizational baseline data, and without using the excluded base measures, the organizational indicator defining an upper control limit and a lower control limit;
determining that the value for the metric is within a range of the organizational baseline data defined by the upper control limit and the lower control limit, or that the authorized approval entity has authorized a corrective action when the value for the metric is outside of the range of the organizational baseline data defined by the upper control limit and the lower control limit;
approving, through interaction with the authorized approval entity, the metric and the base measures in response to determining that the value for the metric is within the range or that the authorized approval entity has authorized the corrective action; and
outputting a representation of the value of the metric and the organizational indicator.

2. The method of claim 1, wherein outputting the representation of the metric and the organizational indicator occurs in real-time to receiving the base measures.

3. The method of claim 1, wherein the metric period is a day, a week, a month, three months, or a year.

4. The method of claim 1, wherein the periodic base measures comprise a budgeted cost at completion, a budgeted cost of work performed, a budgeted cost of work scheduled, an actual cost of work performed, a number of approved change requests, a number of requirements, a sum of impact of change requests, a total risk exposure, a number of active risks, a number of clients facing active risks, a number of realized risks, or a number of clients facing realized risks.

5. The method of claim 1, wherein the aperiodic base measures comprise a number of passed scripts, a number of scripts tested, a number of system investigation requests found, a number of conditions tested, a deliverable type, deliverable acceptance data, a deliverable client first response, a deliverable current status, a deliverable team name, deliverable comments, a milestone name, a scheduled milestone completion data, an actual milestone completion data, a milestone team name, peer review planned data, test pass planned data, actual test passes conducted data, errors found, or removed data.

6. The method of claim 1, wherein the aperiodic incident comprises a system test, a peer review, or a deliverable status.

7. The method of claim 1, wherein selecting a metric further comprises selecting a metric that is valid for the project type and that satisfies a user preference.

8. The method of claim 1, wherein outputting the representation of the value of the metric and the organizational indicator further comprises generating a report including the value of the metric and the organizational indicator.

9. The method of claim 1, wherein the representation displays the value of the metric and the organizational indicator, over a plurality of metric periods.

10. The method of claim 1, wherein the base measures comprise cost and schedule base measures, performance management base measures, scope management base measures, milestone management base measures, contract management base measures, quality management base measures, or deliverable base measures.

11. The method of claim 1, further comprising:
generating a model based upon the approved base measures, a modeling algorithm, and internal model parameters; and
outputting the model.

12. The method of claim 11, further comprising adjusting the internal model parameters based upon user preferences and using the periodic base measures, without using the aperiodic base measures.

13. The method of claim 11, wherein receiving aperiodic base measures further comprises downloading at least one pre-formatted peer review feedback form.

14. The method of claim 11, wherein the model is a problem injection and removal ("PIRM") model, a request turnaround prediction ("RTP") model, or an earned value prediction ("EVP") model.

15. A system comprising:
one or more computers; and
a computer-readable medium coupled to the one or more computers having instructions stored thereon which, when executed by the one or more computers, cause the one or more computers to perform operations comprising:
receiving project information that identifies a type of a project, an authorized write entity for the project, and a different, authorized approval entity for the project;
selecting a metric that is valid for the project type, the metric measuring an aspect of performance of the project;

receiving, through interaction with the authorized write entity, base measures that are used to calculate a value for the metric, the base measures including both periodic base measures corresponding to at least one metric period, and aperiodic base measures corresponding to an aperiodic incident;

calculating the value for the metric using the periodic base measures and the aperiodic base measures;

sorting the base measures into excluded base measures that represent common cause variation, and non-excluded base measures that represent special cause variation;

importing organizational baseline data that is used to calculate an organizational indicator, the organizational baseline data including data that is not specific to the project or to any other single project;

calculating the organizational indicator using the non-excluded base measures and the organizational baseline data, and without using the excluded base measures, the organizational indicator defining an upper control limit and a lower control limit;

determining that the value for the metric is within a range of the organizational baseline data defined by the upper control limit and the lower control limit, or that the authorized approval entity has authorized a corrective action when the value for the metric is outside of the range of the organizational baseline data defined by the upper control limit and the lower control limit;

approving, through interaction with the authorized approval entity, the metric and the base measures in response to determining that the value for the metric is within the range or that the authorized approval entity has authorized the corrective action; and outputting a representation of the value of the metric and the organizational indicator.

16. The system of claim 15, wherein outputting the representation of the metric and the organizational indicator occurs in real-time to receiving the base measures.

17. The system of claim 15, wherein the metric period is a day, a week, a month, three months, or a year.

18. The system of claim 15, wherein the periodic base measures comprise a budgeted cost at completion, a budgeted cost of work performed, a budgeted cost of work scheduled, an actual cost of work performed, a number of approved change requests, a number of requirements, a sum of impact of change requests, a total risk exposure, a number of active risks, a number of clients facing active risks, a number of realized risks, or a number of clients facing realized risks.

19. The system of claim 15, wherein the aperiodic base measures comprise a number of passed scripts, a number of scripts tested, a number of system investigation requests found, a number of conditions tested, a deliverable type, deliverable acceptance data, a deliverable client first response, a deliverable current status, a deliverable team name, deliverable comments, a milestone name, a scheduled milestone completion data, an actual milestone completion data, a milestone team name, peer review planned data, test pass planned data, actual test passes conducted data, errors found, or removed data.

20. A computer storage medium encoded with a computer program, the program comprising instructions that when executed by one or more computers cause the one or more computers to perform operations comprising:

receiving project information that identifies a type of a project, an authorized write entity for the project, and a different, authorized approval entity for the project;

selecting a metric that is valid for the project type, the metric measuring an aspect of performance of the project;

receiving, through interaction with the authorized write entity, base measures that are used to calculate a value for the metric, the base measures including both periodic base measures corresponding to at least one metric period, and aperiodic base measures corresponding to an aperiodic incident;

calculating the value for the metric using the periodic base measures and the aperiodic base measures;

sorting the base measures into excluded base measures that represent common cause variation, and non-excluded base measures that represent special cause variation;

importing organizational baseline data that is used to calculate an organizational indicator, the organizational baseline data including data that is not specific to the project or to any other single project;

calculating the organizational indicator using the non-excluded base measures and the organizational baseline data, and without using the excluded base measures, the organizational indicator defining an upper control limit and a lower control limit;

determining that the value for the metric is within a range of the organizational baseline data defined by the upper control limit and the lower control limit, or that the authorized approval entity has authorized a corrective action when the value for the metric is outside of the range of the organizational baseline data defined by the upper control limit and the lower control limit;

approving, through interaction with the authorized approval entity, the metric and the base measures in response to determining that the value for the metric is within the range or that the authorized approval entity has authorized the corrective action; and outputting a representation of the value of the metric and the organizational indicator.

* * * * *

UNITED STATES PATENT AND TRADEMARK OFFICE
CERTIFICATE OF CORRECTION

| | | |
|---|---|---|
| PATENT NO. | : 7,971,181 B2 | Page 1 of 1 |
| APPLICATION NO. | : 11/457653 | |
| DATED | : June 28, 2011 | |
| INVENTOR(S) | : Pabalate et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1357 days.

Signed and Sealed this
Twenty-second Day of November, 2011

David J. Kappos
*Director of the United States Patent and Trademark Office*